United States Patent

[11] 3,557,352

[72] Inventors Walter R. Hogg
Hialeah, Fla.;
Wallace H. Coulter, Miami Springs, Fla.
[21] Appl. No. 679,840
[22] Filed Nov. 1, 1967
[45] Patented Jan. 19, 1971
[73] Assignee Coulter Electronics Inc.
Hialeah, Fla.
a corporation of Illinois

[54] APPARATUS AND METHOD FOR MEASURING A
DIVIDING PARTICLE SIZE OF A PARTICULATE
SYSTEM
54 Claims, 14 Drawing Figs.
[52] U.S. Cl.................................................. 235/151.3,
235/92, 324/71
[51] Int. Cl....................................................... G01n 15/02
[50] Field of Search.................................. 235/92M(UNX),
151.3; 324/71; 250/218

[56] References Cited
UNITED STATES PATENTS
3,127,505  /1964  Gustavson......................  235/92
3,271,672  /1966  Henderson....................  235/92X
3,331,950  /1967  Coulter et al..................  235/92
3,377,597  /1968  Muta.............................  235/151.3X
3,392,331  /1968  Coulter .........................  235/92X
3,444,463  /1969  Coulter et al..................  235/92X Primary Examiner—Malcolm A. Morrison
Assistant Examiner—Edward J. Wise
Attorney—Silverman & Cass ABSTRACT: Apparatus which uses the Coulter particle analyzing system, converting the pulses obtained from said system into accumulated electrical quantities which may be compared to one another or to other quantities derived from the same system on the basis of which one can adjust the quantities relative to one another to achieve the size of a particle which divides the system into two fractional parts having a particular relationship to one another. A variation of this structure is one in which a particle size is obtained which establishes a point in the particulate system above or below which a predetermined fraction of the total mass exists. The preferred structure uses a threshold circuit responding to particle size and separating the electrical pulses produced by the particles being scanned in the Coulter apparatus through the use of such a threshold. The pulse trains are converted into current and these are compared, adjusting the threshold up and down until the desired relationship is reached in a comparison device. The level of the threshold being calibrated to particle size then represents the dividing size between the two fractions. One of the most useful pieces of information of this kind is the dividing size which is the mass median, in which the respective masses of particulate matter above and below the dividing size are equal to one another.

INVENTORS
WALTER R. HOGG
BY WALLACE H. COULTER
Silverman & Cass
ATTORNEYS

APPARATUS AND METHOD FOR MEASURING A DIVIDING PARTICLE SIZE OF A PARTICULATE SYSTEM

The invention herein relates generally to the art of studying the physical properties of particulate systems and more particularly is concerned with ascertaining accurately certain sizing information about a particulate system.

More specifically, the invention is concerned with obtaining information useful in industrial and other processes where it is essential to describe the system by one or two highly significant statistical quantities such as its mean or average size, or median, or mass median. Probably the most useful for these applications is the one known as the mass median, in which the mass of all particles greater than a dividing size; i.e., "mass median" is equal to the mass of all particles smaller than the dividing size. This may also be referred to as the 50th mass percentile size. Accordingly, the description hereinafter will be directed principally to mass median determination, but the invention is not so limited.

The invention is of such scope as to include structure in which the desired information comprises ascertaining the dividing particle size which separates any two portions of the total mass of a particulate system, and indeed, reference will be made hereinafter to the structure for achieving different fractions.

Another aspect of the invention comprises providing apparatus in which it is desired to ascertain the amount of mass contained in a particulate system above and below a certain size and as well the mass distribution or degree of uniformity in the system between various dividing sizes. In the latter connection, the data is obtained by ascertaining several dividing sizes, and without the need for plotting any curves.

For the purposes of this specification and the claims which are appended, it is advisable to define the significance of the phrase "mass median" as used herein. "Mass median" is intended to define, by particle size, the location along the spectrum of a particulate system at which the mass of all the particulate material in particles greater in size is exactly equal to the mass of all the particulate material in particles smaller in size. Expressed in another way, and utilizing the familiar integral curve display of a particulate system which shows percent above stated size, the mass median is the point on the particle size scale corresponding to the 50percent point on the percent mass scale of that curve. There is 50 percent of the volume of particulate matter above and below this point. The location of the point will give a particle size.

The apparatus which is utilized for making the measurements and practicing the methods of the invention operates on the principle disclosed in U.S. Pat. No. 2,656,508, such principle being known as the Coulter principle and being utilized in apparatus now sold as the "Coulter Counter." According to that principle, each time that an individual particle traverses an electric current path of small dimensions in a sample of suspension carrying such particles, an electric change is produced in the sensing zone of the apparatus, the amplitude of which is proportional for all practical purposes to the total volume occupied by the solid matter of the particle, irrespective of its configuration. Assuming that the particles are all of the same material or at least the same known density, the electrical change is also proportional to the mass of the particle material of that particle. The geometrical shape of that particle is of little importance, and hence as used herein the word "volume" means the actual volume occupied by the material of the particle. It is synonymous with the words "mass" and "size" as used herein.

In the art of studying particulate systems, certain nomenclature used in statistical analysis might seem of value, and it is important to differentiate between the phrase "mass median" as used herein and such other nomenclature in order to avoid confusion. Some of the words used in statistics which can be misleading if applied to the desideratum in this case are "mean," "average," "median," and "mode" all of which are expressions or examples of what has been described as "measures of central tendency." It may be considered as a general proposition that none of these terms will give statistical measurement which is desired herein with accuracy that is, none of them should be considered the equivalent of mass median.

Just to take an example, the median of a particle system would be the size of the particle which is the numerical center one of that system with the particles arranged according to size. If there are 101 particles in a system, to use a simple example, arranged in their order of size, the 51st particle would be the median particle and its size would be the median size. Studies have shown that in particulate systems of fairly wide dynamic range the mass of particulate material above and below the median particle will not usually be the same. The particle at the mass median, according to the invention, will be located at a position irrespective of the number of particles, and almost in every case will not be at a point which is defined by any of the statistical expressions used above.

In many industrial processes, the size of particle at the mass median or other mass percentile location has become an important criterion. For example, it is a particle size which may be used to define any given system. By reason of classical methods of particle study through the use of Stoksian techniques of sizing, engineers have tied their commercial processes to the number representing the mass median. In the manufacture and utilization of abrasives, inks, carbon, metal powder and so on, the determination of this size may be critical.

Inasmuch as persons skilled in this art have become accustomed to the use of mass percentiles, it is an object of the invention herein to provide instrumentation for obtaining this information. The invention herein enables any dividing size of particle to be used, that is, it enables the worker to define a system by a size of particle dividing the system into two parts whose masses have any desired relationship. Surely a more complete description of a system would be one which gave two or even more dividing sizes one of which could be the mass median and the others, for example the 25th mass percentile and 75th mass percentile dividing sizes. The difference between these sizes is an indication of the "width" of the particle size distribution.

The invention herein provides a simple and highly useful tool to enable the derivation of more accurate information concerning particulate systems and opens a broad vista based upon better definition of systems and hence better communications between those working in the art.

Prior methods of arriving at the mass median size have been tedious, inaccurate, expensive or all three of these. All the more problems would be encountered in ascertaining a dividing size in which the two fractions of the system were not equal or had a particular relationship to one another. The manual method of ascertaining mass median particle size consisted of classifying particles into various size ranges, calculating the total volume in each size range, (which calculation involved an estimate as to the true center of each range) performing a progressive addition or summation in order to construct the integral curve and observing the point at which the resultant curve crosses the ordinate representing 50 percent of material above stated size. The curve as actually constructed was a series of connected steps, each step representing one range. Thus, in order to achieve the actual curve, an approximation was made by smoothing the curve through the average of each range. To increase accuracy, one was required to increase the number of ranges, resulting in more tedium and more computation, or complex computing equipment was required.

The Coulter Counter which was used to avoid Stokesian techniques did not in any way vary the method. The particle sizing apparatus, even if operating on the Coulter principle, was provided with a plurality of channels to obtain the necessary data. It was necessary to increase the number of channels, and hence the expense and complexity of the apparatus needed to increase the accuracy was accordingly increased. Where computers were used to process the data obtained from the particle sizing apparatus, an increase in channels likewise would increase expense, complexity and space needed for such apparatus.

Again, in the use of the electronic or optical apparatus for obtaining and processing data, the results had to be graphed and estimates made in smoothing such graphs in order to find the point which has been defined herein as the mass median. Similar problems existed as to any other points.

The primary object of this invention is to provide a method of and apparatus for obtaining the dividing particle size of a given particulate system which is based upon the use of a complete departure from all known methods of making such a determination.

Still another object of the invention is to provide a method and apparatus for determination of the dividing particle size of a particulate system which is substantially more accurate than all prior methods and apparatus in that the need for using multiple channels is eliminated; the need for using the average size of particle in each channel is obviated; the need for constructing and estimating the graph of an integral curve is eliminated; the need for complex and expensive equipment is dispensed with.

Still a further object of the invention is to provide a method and apparatus for determining the dividing size of a particulate system in which the particles of the system are caused to move relative to scanning means to produce signals related in value to the respective particle sizes, dividing the signals into two groups of signals above and below a particular value of signal related to a given size of particle by means of adjustable separating means, measuring or comparing the accumulation or rate of accumulation of two electrical quantities representative, respectively, of the signals of each group and adjusting the separating means so that the quantities so measured achieve a particular relationship, the separating means being calibrated to provide an indication representing a number proportional to the dividing particle size of the particulate system for a mass relationship between divided parts equal to the relationship between said compared quantities.

Still another object of the invention is to provide apparatus in which a reference voltage related to the total mass of particulate material of a system is provided by gross methods and is compared with a signal representing particulate material above or below a certain variable threshold whose level is calibrated according to particle size, the latter signal being obtained by use of Coulter scanning means operating on a sample of the same particulate system, then comparing the reference voltage reduced by a known factor with the said signal and varying the threshold to achieve a condition representing equilibrium and thus ascertaining the dividing particle size from the level of the threshold.

Still further objects of the invention are to provide apparatus for measuring the dividing size of a particulate system automatically.

Another object of the invention is to provide apparatus for measuring the dividing particle size of a particulate system in which the signal producing means include either a single aperture or a multiplicity of apertures of different sizes.

Other objects of the invention are to provide apparatus for measuring the dividing particle size of a particulate system automatically and directly, in a continuously flowing system or of a quantity or batch of sample.

The invention has as important objects the ends sought in all of the above set forth objects in which the dividing particle size is specifically the mass median size of a particulate system, that is, the 50th mass percentile size. Other points such as the 25th and 75th mass percentile sizes are also of importance, and the invention includes ascertaining these as well.

Many other objects of the invention will become apparent to those skilled in this art as descriptions of preferred embodiments of the invention proceed hereinafter in connection with which the drawings illustrate the same. Such drawings are for the most part diagrammatic in nature since the components which are used to construct the apparatus illustrated for the most part can be made up of electrical and mechanical elements which are known to those skilled in the art and which can be reproduced once the principles of operation and function are described. Likewise, demonstrative diagrams are used to explain the method and operation of the apparatus, it being intended that these will be considered exemplary and not limiting.

In the drawings in which like or similar reference numerals are used to identify like or equivalent components throughout the several FIGS.:

Figure 1:
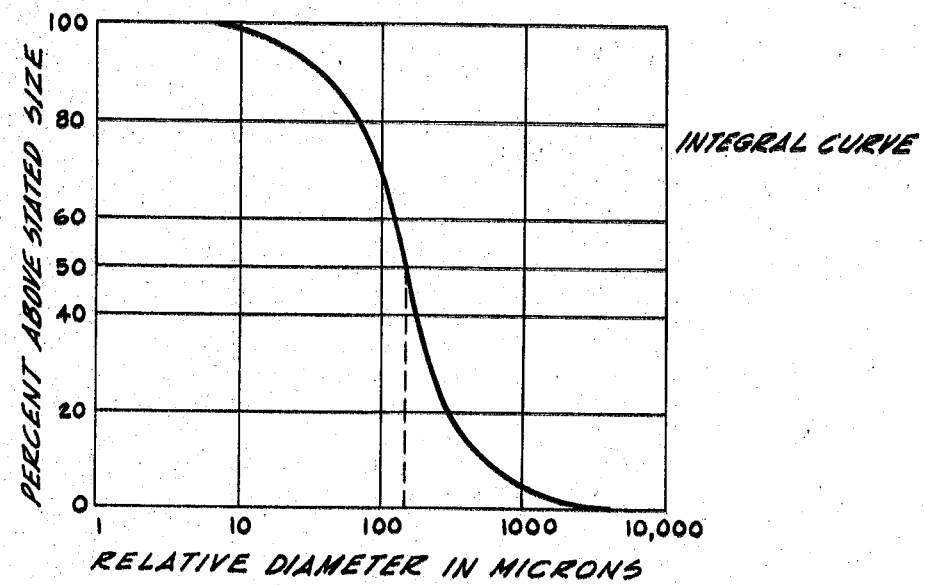
FIG. 1 is a graph illustrating the integral curve of a particulate system of relatively wide dynamic range in the classical ogive configuration.

Generally the invention is concerned with a method and apparatus for finding the mass dividing particle size or several dividing sizes for a particulate system which is a radical departure from prior apparatus and methods.

As indicated above, in the classical techniques, whether using Stokesian, electronic or optical methods, the worker was required to develop a graph representing the statistical data he learned. From this graph he picked off a point which has been defined herein as the mass median particle size. He could ascertain some other mass dividing particle size from the graph, but this merely complicated his problem. The entire concept of prior techniques was to make as accurate a graph or data accumulation as possible. Thus, the quality of the determination was dependent upon the number of points used to construct the graph or accumulate the data. The number of points was obtained by making measurements in a number of ranges and estimating the location of the points. The more points the smoother the graph. Similar techniques were used in connection with data stored in computers or tabulated.

According to one aspect of the invention, the particles of a system are observed and separated into two groups, those above a particular size somewhere in the center of the size spectrum and those below that size. The size is that which, when properly chosen, will result in the mass of those larger than the size having the desired relation to the mass of those smaller than the size. When this condition obtains, the particular size is the dividing particle size as defined herein. If the size is the 50th mass percentile, then this dividing size is the mass median.

While it might be simple to describe this method, and indeed the method is quite basic, nevertheless, the simplicity seems to have been lost to workers in the particle field. All prior methods and prior apparatus seem to arrive at the end result by devious, complex and usually inaccurate methods and apparatus which are, in fact, merely carryovers and iterations of techniques developed during the time when measuring equipment was of the most rudimentary nature. The present method and apparatus do not classify particles, for the purpose of deriving an analysis based upon such classifications. Instead, the reading is one of the direct measurement.

In effect, each particle is changed into another quantity which may be accumulated, the quantity being proportional to the size of the particle. This quantity is conveniently an electrical charge as in most of the preferred embodiments illustrated, but may also be digital codes. The particles are then divided into two groups according to their size greater than or less than a chosen size. This chosen size, for example, could be represented by a threshold circuit whose voltage level discriminates between signals produced by the respective pulses as they pass some scanning device. By changing the voltage level of the threshold circuit, one may vary the limits of the pulses which are permitted to pass through.

The main pulse signals are changed into representative electrical quantities such as charges which are proportional to the signals and hence the respective sizes of the particles producing them. These signals are passed to either one of two channels to respective accumulating means each of which builds up a charge proportional to the total number of charges which are permitted to enter it. Using the control established by the variable threshold circuit, the charges are switched to one or the other of the channels and its accumulating means. The threshold level of the threshold circuit is changed either manually or electrically until the two accumulated amounts of charge have the desired relationship, for example, are equal. When they are equal, the total mass of particles producing the level of charge in the one accumulating means is equal to the total mass of particles producing the same level of charge in the other accumulating means. In the practical device, the equality is represented by a state of equilibrium in the output circuit.

At this condition, the threshold level is related to the mass median particle size, or any other chosen dividing size and it is a simple matter to calibrate some voltage or indicator reading to obtain a number representing this size.

It is believed that there are many ways of accomplishing the above described method and some of them are mentioned preliminarily to a description of several preferred embodiments.

The accumulating means could be compared in a summing network operating into a sensitive device such as an integrator which produces an output proportional to the difference, and the output could then be connected in a feedback circuit which adjusts the threshold circuit automatically until a condition of equilibrium is reached. Suitable read-out means connected with the feedback circuit would be calibrated to read a number representing dividing particle size.

Any of the above described apparatus could be used with a single scanning means, or in case the particulate system which is of too wide a dynamic range, with a plurality of scanning means each arranged to handle a different range of particles.

Many different kinds of accumulating means and switching circuits could be used, but all have in common the requirement that the pulses produced by the particles are to be divided into two groups, respectively greater and smaller than the desired dividing particle size. The dividing line is then varied until the point is reached at which the total mass, represented by accumulated charge or charge-per-unit-time (particulate volume per unit volume of sample) flowing in a conductor (electric current), of one group bears the desired relationship to the other.

The invention is applicable to batch determinations and onstream determinations.

Another aspect of the invention is concerned with a method in which one quantity is derived from the particulate system by some gross method used to ascertain a 100 percent voltage. This voltage is attenuated to achieve the percentage value against which the other quantity, derived by Coulter methods, will be compared. Apparatus embodying this concept will be described in detail.

Coming now to the description of the preferred embodiments, attention should be directed first to a simple discussion of the classical statistical tools of particle workers, the use of which is rendered unnecessary by this invention, but the concepts of which should be understood to understand the invention.

Figure 2:
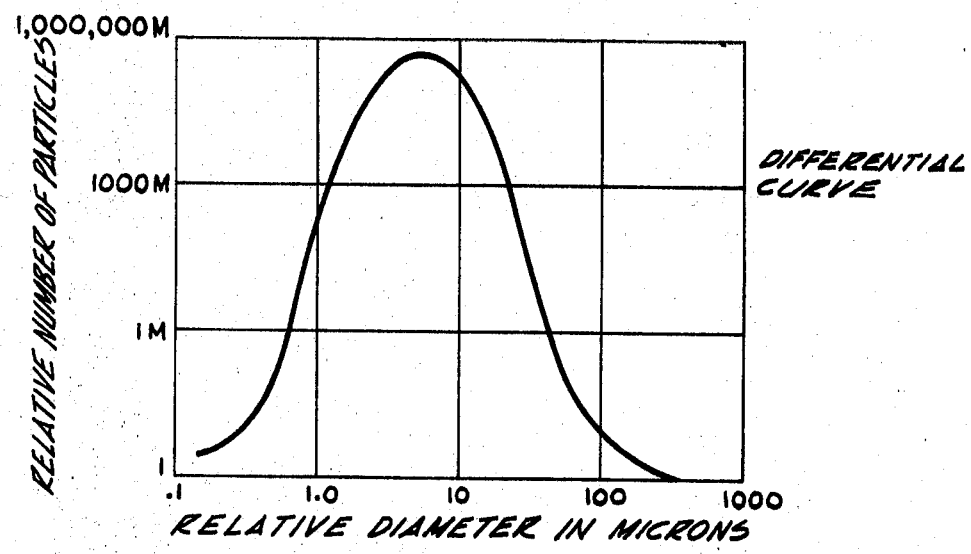
FIG. 2 is a graph illustrating the differential curve of a particulate system of relatively wide dynamic range in the classical bell-shaped configuration.

FIG. 1 is an ogive-shaped graph which is known as the integral curve of a particulate system and FIG. 2 is a bell-shaped graph which is known as the differential curve. Since these graphs are merely illustrative, it should not be assumed that they are representative of the same system. Each type can be converted to the other. Normally a worker starts with a differential curve and converts it into an integral curve.

The differential curve of FIG. 2 is a simple size distribution curve. Since there are so many millions of particles in the usual industrial slurry or powder the two coordinates are logarithmic. The vertical scale on the left gives the number of particles and the horizontal scale on the bottom gives the diameter of particles in microns. "Diameter" as used in such determinations is a rather vague concept originally used for lack of any better criterion, and is derived by somewhat empirical methods. The use of a Coulter apparatus enables these curves to be made with the horizontal scale reading in equivalent spherical diameter quite accurately.

The "equivalent spherical diameter" of a particle is the diameter of a sphere having the same volume and hence is proportional to the cube root of its volume, and since in this discussion we have equated volume, mass and size, the diameter is proportional to the cube root of the mass of the particle. Throughout the discussion, it should be understood that the density of the particles is assumed to be known and uniform, which will be the fact in practically all cases. The classical integral and differential curves were plotted using the parameter of particle diameter because until the advent of the Coulter apparatus, particles were described by their appearance under a microscope; most counting and sizing was done optically and by sedimentation methods. Accordingly in the description of the basic apparatus and method, since the read-out will be a number proportional to mass, it will usually be found convenient to convert this to a number which is proportional to the cube root of mass in order to obtain the number in terms of particle diameter. This can be done by suitable electronic circuitry or mechanical computing devices. One structure which has been found convenient is a cube root servomechanism whose input is the read-out from the apparatus.

No further mention will be made of this point or apparatus shown to accomplish the operation.

Continuing with the discussion of the curves of FIGS. 1 and 2 the integral curve is a computed or laid-out curve. It is derived from the differential curve. This latter curve is also constructed from data obtained by classifying particles. The result is a histogram, as will be described in connection with FIG. 3. In other words, the particles are classified according to ranges, a histogram of relative number versus range is laid out to produce the bell-shaped general curve. This is not smooth as shown, but is a histogram of steps. The bell-shaped histogram is converted into the ogive histogram by adding numbers related to mass derived from the histogram steps cumulatively starting at the largest particles and proceeding to build a new histogram. This is shown in FIG. 3.

Figure 3:
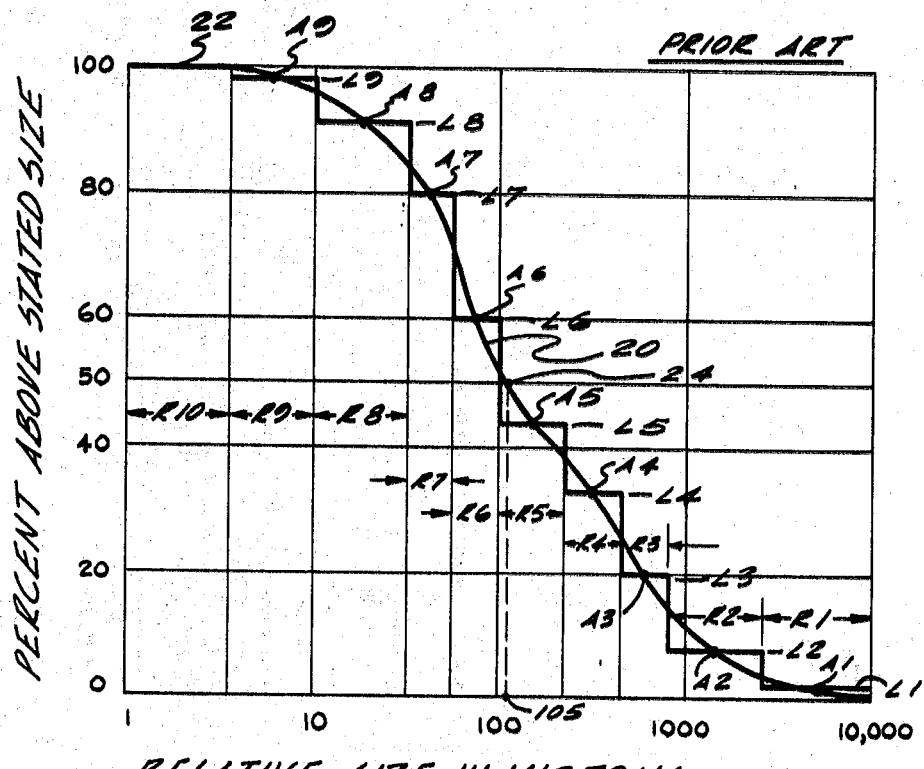
FIG. 3 is a graph illustrating the prior techniques of constructing an integral curve similar to that of FIG. 1 for the purpose of deriving the mass median particle size of a particulate system.

In FIG. 3, there is a plurality of levels L1, L2 and so on through L9. Each level represents an accumulated mass of particles at the range indicated. The ranges are designed R1, R2 and so on through R10. Each range represents a classification of particles chosen as a result of experience to give the best form of histogram with the maximum of data at the most critical points. Note that at the large particle end there is a level L1 which is achieved by counting and computing the mass of the particles in a relatively broad range R1 because the number of particles is small but their mass is quite large. The range R2 provides a part of the data for the level L2. The level L2 represents the total mass of particles in range R1 and range R2. The level L3 represents the total mass of particles in ranges R1, R2 and R3. At the start of constructing this curve, the left hand vertical scale is laid out in some unit which is related to the size of particles. In classical determinations this could be cubic microns or micrograms. The values are not important so long as the proper scale is followed. After the entire histogram has been constructed, the last level L9 has been laid out at range 9 as close to the maximum mass as possible. Various techniques, such as the use of log probability graph paper may be utilized to extrapolate to total mass if a significant fraction of mass is represented by particles too small to be measured. In a system such as represented by FIG. 3, the range containing the very smallest particles will contribute very little to the total mass. Most particulate systems of this type have that same character. This fact is very useful to the apparatus of the invention since it enables the small end of a system to be established by some low threshold level which excludes noise and "hash" from the system.

After the histogram is laid out, one chooses the center point of each step, as indicated at A1, A2, A3 and attempts to draw a smooth curve through these points, the last point being A9. This results in the curve 20 which has been extrapolated as at 22 to provide the maximum mass level. This represents 100 percent of the mass of particles and if the left hand coordinate axis is divided into percentage, as shown, any point on the curve gives the percent of mass above a stated size.

Once having done this, the technician chooses the 50 percent volume or mass above stated size on the left vertical ordinate, finds the point 24 on the curve 20 which this intersects, and follows down to the horizontal coordinate for the size of particle this represents. The value on the horizontal axis at the 50 percent point is the mass median size of particle for the particulate system. This size is shown to be 105 microns. The same technique is used to ascertain any other dividing size.

Variations of such graphical techniques have been devised, such as, for instance, the method described recently by Dr. B. H. Kaye and C. R. G. Treasure in British Chemical Engineering (Oct., 1966, Vol. 11, No. 10 pp 1220—1221) but it is to be observed that their method is still based upon the gathering together of particles into a relatively small number of size ranges, multiplying the number in each range by the mean size of that range, and performing a progressive addition.

In the case of apparatus in which it is feasible to obtain data on particle size directly, as for example in the case of the Coulter Counter, the construction of the integral and differential curves is made easier.

Figure 4:
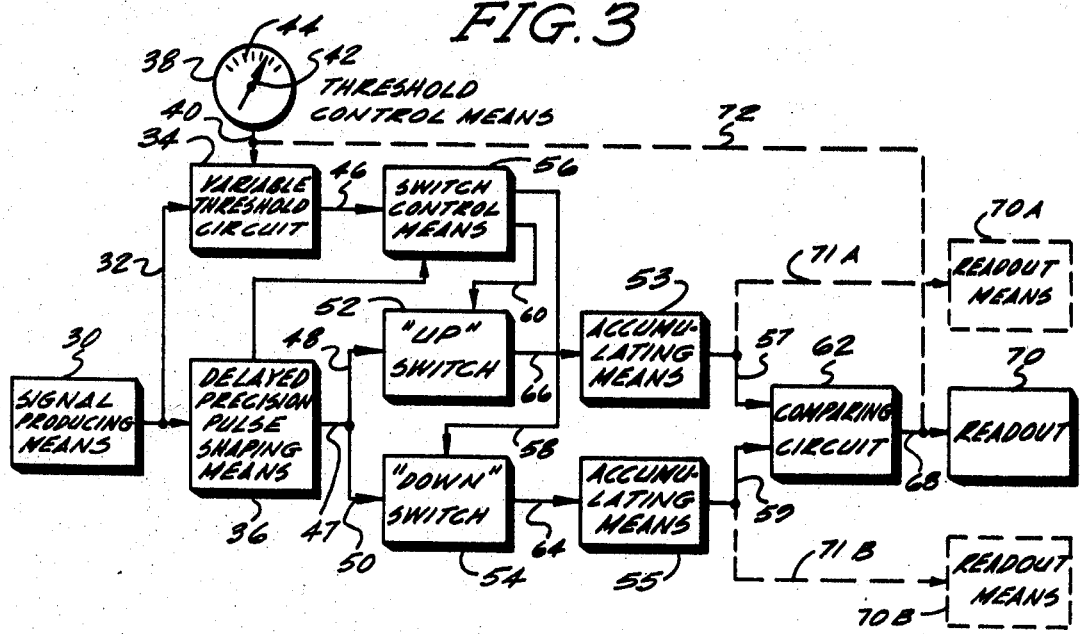
FIG. 4 is a block diagram illustrating a basic apparatus for use in measuring the mass median particle size of a particulate system using a single Coulter apparatus for deriving quantities related to the parts of the system.

In FIG. 4 there is illustrated a basic structure which operates in accordance with the invention using a manual threshold circuit. The block 30 comprises a Coulter particle analyzing device for producing a signal which results from the scanning of a particulate system. The signal producing means comprise an electric field of small dimensions which may be established by the usual aperture tube, current source and detector, the latter including one or more amplifiers. The aperture tube has a minute aperture through which the suspension of particles is caused to flow and an electric current is established from one side of the aperture to the other to pass through the aperture simultaneously with the passage of the suspension. This can be an onstream tube or a batch tube. Each time that a particle passes through the aperture there is a change in the impedance of the liquid which is in the aperture and this is detected as an electrical change by means of electrodes immersed in or other wise coupled to the suspension at opposite ends of the aperture. Suitable amplifiers and other circuitry enables the electrical changes to be converted to signal pulses which are proportional to the volumes of the respective particles which produced the same.

These signals then appear at the point 32 and they are channeled to the block 34 which is labeled "Variable Threshold Circuit" and to the block 36 which is labeled "Delayed Precision Pulse Shaping Means".

The purpose of these two blocks 34 and 36 is to discriminate between signals which result from particles above the assumed mass percentile particle size and those which result from particles below the assumed mass percentile particle size, and to obtain a value representative of the total of all of the pulses of each category.

Assuming for the moment that the variable threshold circuit includes an element or component which can be varied in order to change the level or threshold of voltage and that this component is varied in some manner through the control of a knob or movable member, the member may have a scale or dial that can be calibrated in terms of particle size. Thus, there is shown some form of dial or control at 38 that is mechanically or electrically connected with the variable threshold circuit 34 through some coupling 40. An indicator 42 moves over a dial 44 that has numbers marked on it, and these numbers represent particle sizes. For example, if the dial is moved to a number 100, the threshold level of the circuit 34 might be set to cause output pulses to appear at connection 46 only upon the occurrence of signal pulses produced by particles of 100 cubic microns in size and larger. This information can thus be used to route charges representing the respective pulses to either of the described channels.

In the block 36, there are contained components which convert the voltage pulses at 32 to quantities of charge proportional to the amplitudes of the respective voltage pulses causing same. This is done since it is necessary for this computation to add and subtract quantities which do not coexist, and therefore the earlier information must be stored. It will be shown later that there are alternate methods for storing pulse amplitude information, but for purposes of explanation, the necessary storage will be performed in the first apparatus to be explained by converting pulse amplitudes to proportional quantities of electrical charge and transferring these charges to an integrator. The transferral of electric charge, as is done by means of paths 64 and 66 of FIG. 4, results in a current, the average current in each path being equal to the total charge transferred in a given interval of time divided by that time.

Accordingly, each pulse that arrives at 32 is charged into a quantity of charge which is developed by forming a current pulse on line 47 and hence in either input 48 or 50 of the switches 52 and 54, respectively. The switch 52 which is designated "up" will pass only charges which are caused by the larger particles, and the switch 54 which is designated "down" will pass only charges which are caused by the smaller particles. The normal condition of the switches is with the switch 52 blocking passage of charge and the switch 54 normally passing charge.

As stated above, if a signal appears which exceeds the threshold set by the control 38, it will produce a signal at 46. This drives the switch control 56. For the particular arrangement shown, the channel 8 normally holds switch 54 in conducting condition and the channel 60 normally holds switch 52 in nonconducting condition. This means that signals produced by particles smaller than the size represented by the level of the threshold 34 pass through the switch 54 into the accumulating means 55. If, on the other hand, a signal pulse arrives which does exceed the measuring level established by variable threshold circuit 34, an output will be produced at 46 which causes the switch control 56 to operate switches 52 and 54 such that switch 52 conducts and switch 54 is made nonconductive, causing charges generated by 36 to pass through the switch 52 into the accumulating means 53. The accumulating means 53 and 55 conveniently comprise integrators.

In this manner, the accumulators 53 and 55 respond to the particulate mass of particles larger and smaller than the measuring level, respectively. If integrators are used as the accumulators, the charge stored in each will be proportional to the total particulate mass above or below the measuring level from the time the pulse train representing particle volumes commences to the time at which a reading is made. If resistors are placed across the integrating capacitors of the integrators, the accumulating means become low-pass amplifiers which respond to the direct component of the current which results from the transfer of the charges developed and thus have outputs which are proportional to units of particulate mass per unit time. The former method is useful when investigating discrete amounts of sample dilution since there is a limit to the charge which can be stored by each integrator; the latter is more useful for "onstream" applications since the two accumulator outputs at 57 and 59 stabilize at levels proportional to the fractions of mass in the two categories and remain in this condition without time limitations. These outputs may be observed by read-out means 70A and 70B if desired, and compared visually to determine equality or other useful relationships.

The preferred form, however, eliminates the need for separate accumulators, basing its operation on the mathematical identity $$i_1 dt - i_2 dt = (i_1 - i_2) dt$$

which shows that one integrator integrating the difference of two currents will have the same output as will be obtained by integrating each of the currents separately and finding the difference between the individual integrated output signals. This preferred form has the further advantage that eventual saturation of an integrator is obviated since as will become clear later its input is usually an error signal which is nulled.

Figure 5:
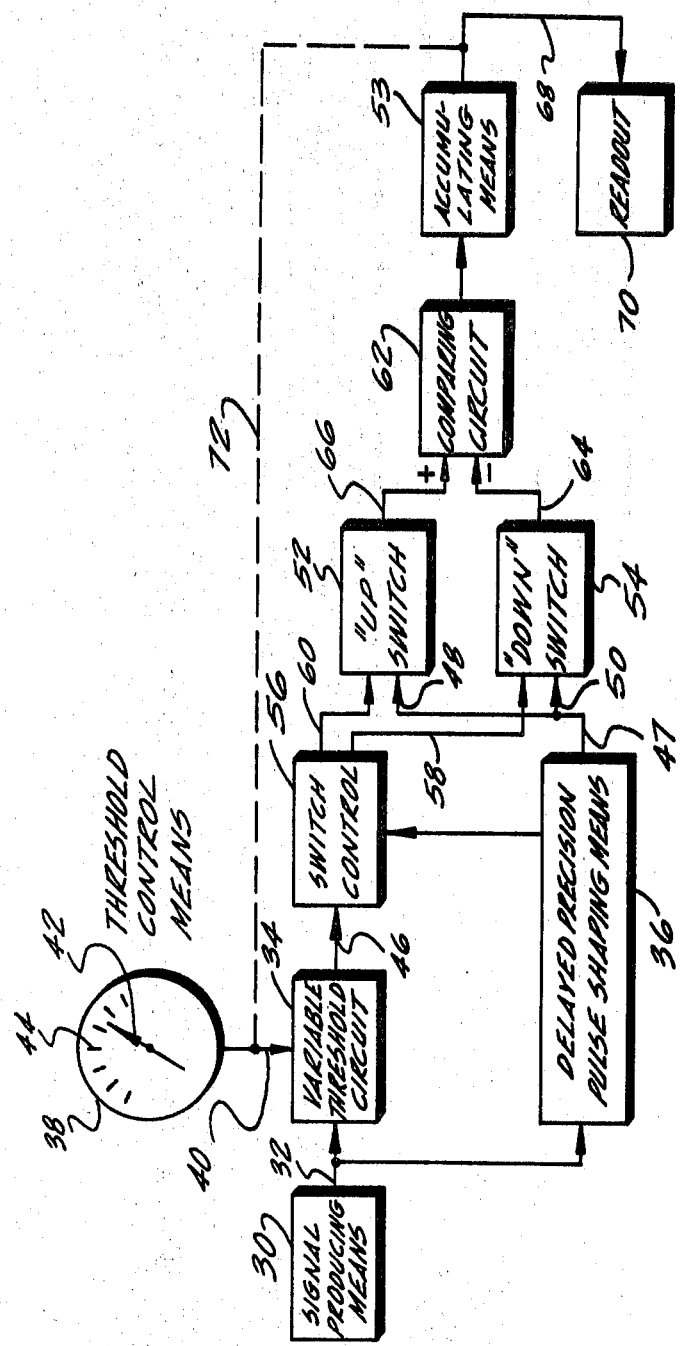
FIG. 5 is a block diagram based upon FIG. 4 but illustrating structure embodying certain important simplification in the concept represented by the structure of FIG. 4.

The resulting simplification is shown in FIG. 5. The connection between the down switch 54 and the accumulating and comparing circuit 62 is at 64 and is marked minus, signifying that minus charge is being applied, i.e., charge is being withdrawn from an accumulating integrator, for example. The connection to the up switch is designated 66 and is shown positive to signify the pumping of charge into the integrator. One increases the stored charge and the other decreases it.

Continuing with the discussion, consider a large pulse that exceeds the threshold level. It will change the condition of the channels 58 and 60, reversing them, so that the down switch is blocked and the up switch 52 conducts. The charge from the pulse shaping means 36 now enters the comparing circuit 62 at the connection 66.

In this manner, the charges which are accumulated in the comparing circuit will be not only proportional to the volumes of the particles which caused them, but positive for large pulses and negative for the small pulses. The total charge will depend in addition upon the number of pulses. Accordingly, the output at 68 would be proportional to the total net charge which has come from the comparison circuit at any given time.

If the number chosen to represent the threshold level is that number on the dial 44 representing the precise mass median particle size, there will be precisely as much positive charge applied to the integrator of the comparison circuit 62 as negative charge applied. Theoretically, the comparison of these charges should result in a zero or unchanging readout in the device 70. Accordingly, if the signal producing means has run through a given quantity of sample at one setting of the dial 44 and there is an indication at the read-out 70 one way or the other relative to zero, another run can be made with a new setting, and by several trails the mass median particle size could be found. Any other dividing particle size may be ascertained in a modified manner.

Practically, most samples are homogeneous, and the determination can be made while the sample is being run. The longer the run, the better the statistics. The threshold level may be manually varied by some means while watching the read-out until the zero or any other reading remains for a substantial length of time. The control rests in means 38.

In practice, it is a relatively simple matter to automate the apparatus. Instead of a manual threshold control means 38, the output of the comparing circuit 62 may be used to cause the threshold level to hunt for the condition where the charges at the inputs to the comparing circuit are equal or have some percentage relationship. The comparing circuit in such instance may include an integrator which has a finite output for a condition of balanced positive and negative inputs and this may provide a voltage on the connection 72 shown in broken lines, extending directly to the variable threshold circuit 34. The read-out 70 in this case may be arranged to read the signal level on the lead 72 as a measure of mass median particle size. This will be explained in connection with the structure of FIG. 5.

In FIG. 5, the comparing circuit for a simple manually operated device would be a pair of summing resistors arranged algebraically to add the currents caused by the respective switches. If these resistors are equal and the output at 68 is zero, then the threshold set in by the device 38 represents the mass median size. If the resistors are changed so that the scale factors are weighted differently, such as for example, a voltage signal on path 66 would produce a current which would cause three times as much charge in the upper or larger portion of the system than would the same voltage signal on the path 64 in the lower or smaller particle portion of the system. As a result, the feedback would effectively raise the threshold level to restore an equilibrium to balance the currents in the two paths. The threshold measured at 38 will then read the 75th mass percentile particle size. Any resistor relationship can be used to find any dividing size.

If desired, by several runs, points defining a system may be ascertained. Thus, assuming the first run as described, the mass median size is determined. Thereafter, using the mass median size as the upper limit, by adjusting a circuit between the signal producing means and the junction at 32 to pass only particles smaller than this mass median size to the apparatus of FIG. 4, another run is made, and the mass median size of the lower half of the system is ascertained. In this manner, the 25th mass percentile of particle size is obtained. If a third run is made, but with a threshold circuit interposed arranged to pass only particles larger than the mass median, the 75th mass percentile may be ascertained. One way of accomplishing these ends is incorporated into the apparatus of FIG. 9 to be described below.

Figure 6:
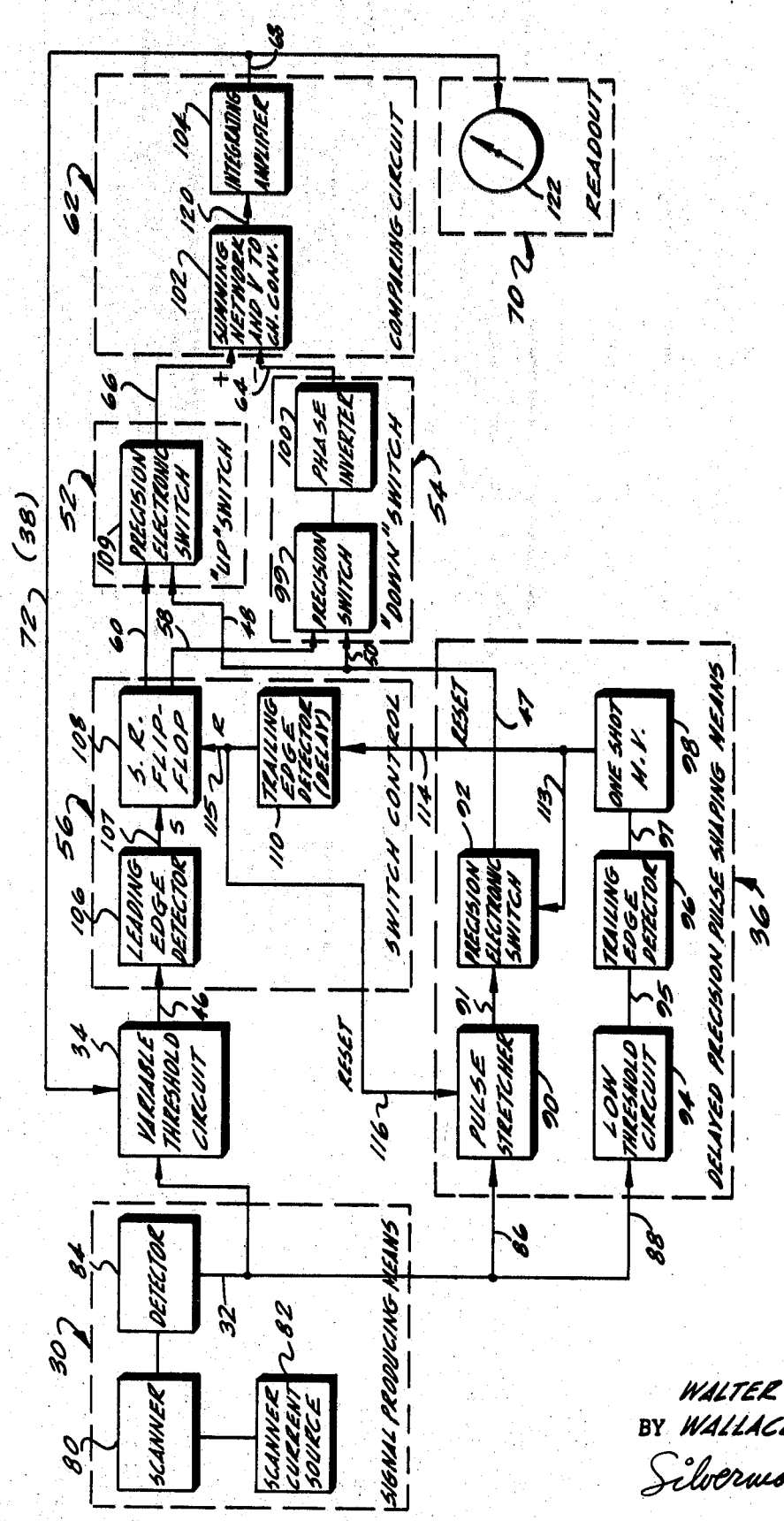
FIG. 6 is a more detailed block diagram of the apparatus of FIG. 5, the apparatus being automatic in this case, as compared to the apparatus of FIGS. 4 and 5 which are manual.

FIG. 6 is a block diagram in more detail than FIG. 5 showing the components of analogue apparatus for obtaining the mass median particle size of a particulate system, an effort being made here to refer to the parts of the apparatus in terms familiar to those skilled in the electronics art.

The signal producing means 30 in this case is identified by the broken line box on the left and may be assumed to consist of a Coulter Counter of some type. The scanner 80 would normally consist of the Coulter-type glassware in the sample handling facility including an aperture tube, electrodes, electrical connections, means for causing the flow of liquid, etc. The aperture of the scanner has the usual source of current 82 which, although shown as a separate block, would customarily be included in the same housing with the amplifier and its electronics. The amplifier and associated circuitry serve to detect the signals produced in the scanner 80, and hence are referred to as detector 84. For the purposes of this type of application, a considerable portion of the detecting apparatus could be eliminated, since all that is required at the output 32 is a succession of pulses each of which is proportional to the size of the particle which produced it. The usual threshold circuits, cathode ray oscilloscope, counters and the like are not necessary, but could be convenient for the worker.

As seen, the signals at 32 are applied to the variable threshold circuit 34 and the delayed precision pulse shaping means 36 the latter being a broken line block containing a plurality of components to be described. There are two inputs into the shaping means 36, one at 86 and one at 88. The pulse stretcher 90 is a circuit which retains the amplitude of the incoming signal until a rectangular pulse of precise duration and the particular amplitude is produced. This latter effect occurs in the precision electronic switch 92 and the control for this function is obtained by means of the input 88.

The input 88 is applied to a low threshold circuit 94 set at a level which does not respond to electrical noise. This is quite close to the base line of the particle-produced pulse signal waveform, representing substantially the smallest practical particle which will be detected. Any signal which does not exceed this low threshold level will not produce current pulses in the output 47 of the precision electronic switch. Any signal which does exceed this low threshold will cause a pulse at 95 which will have its trailing edge detected in the detector 96. This produces a small pip or trigger pulse that triggers the one-shot multivibrator 98 for a time sufficient to produce the desired duration operation of the switch 92. As a result, the line 47 receives a pulse having the amplitude of a particle produced pulse and a duration of the pulse from the multivibrator 98. The delay referred to in the description of the converter 36 is caused by the fact that the multivibrator pulse on the line 113 occurs starting with the trailing edge of the signal crossing the low threshold, while, as will be see, the switching required to direct the charges into the comparing circuit will occur on the basis of the leading edge of the same pulse crossing the voltage level of the variable threshold circuit 34.

As thus far described, the output at 47 is a succession of current pulses of known duration, and of amplitude proportional to particle size. It becomes necessary to cause each pulse either to provide a positive or a negative charge, depending upon whether it has been caused by a particle larger or smaller than the size represented by the level of the threshold circuit 34. Since the switch 54 is in condition to accept charge for small pulses, all small pulses will pass through the precision switch 99, will be inverted in the phase inverter 100 and pass into the summing network 102 of the comparing circuit 62 as negative charge. From the summing network, the charge is applied to the integrator 104 which is a very high gain circuit, so that at 68 there will be a voltage output proportional to the charge stored in the integrator.

The conversion from pulse amplitude as a signal voltage to a proportional electric charge for storage in the integrator may in some instances be more easily accomplished by charging a small capacitor to a voltage proportional to a particle volume and dumping this charge into the integrator as is done in the familiar "pump" circuit.

If on the other hand, the pulse at 32 is larger than the level of the variable threshold circuit 34, a pulse is applied to the switch control 56. It first passes through the leading edge detector 106 which produces a trigger pulse from its leading edge. The set-reset flip-flop 108 is normally in a state which causes the down switch 54 to transmit and the up switch 52 to block pulses from precision electronic switch 92. When a trigger pulse from leading edge detector 106 is applied to the "set" input terminal of set-reset flip-flop 108, the flip-flop changes state to permit passage of a current pulse in the lead 48 through the precision electronic switch 109 in the up switch 52 until another pulse is applied to its "reset" terminal via path 115. This reset pulse is generated by detecting the trailing edge of the multivibrator pulse on connection 114 by means of trailing edge detector 110 which may also include means for delaying the trigger pulse slightly, for instance a delay line. Since the voltage to charge conversion has been completed at the end of the multivibrator pulse, the set-reset flip-flop and the pulse stretcher may be reset at this time in preparation for the next particle-produced pulse. The slight delay, if one s incorporated, enhances accuracy by ensuring that the electronic switches 52 and 54 have had time to change state before resetting the set-reset flip-flop and the pulse stretcher. This is normally on the order of a microsecond. For low counting rates making longer multivibrator pulses permissible the delay may be omitted without seriously affecting accuracy.

In this manner the summing network will always be producing at its output 120 the algebraic sum of charges applied to its input and applying the output to the integrator 104. These charges are being transferred, thereby giving rise to currents in their several paths. Since there is always a finite output of substantial voltage at 68 due to the high gain of the integrator, it can be used to change the level of the threshold device automatically through the feedback connection 72 and is measured in a suitable voltmeter 122 in the read-out means 70. Since this feedback connection is the threshold control means for the apparatus of FIG. 5, it is the automatic equivalent of the manual control means 38 and hence the same number 38 is shown alongside the number 72. The state of equilibrium will result in a substantially steady reading of read-out 70, which is increasingly steady for larger integrator storage capacities.

The components represented by the various blocks should easily be understood by those skilled in electronics. Considerable choice of circuitry exists, hence there is no need to show the specific details of any example. Some comments however would be helpful.

As explained previously, the signals appear at the output 32 of the signal detecting means as electrical pulses whose amplitudes are respectively proportional to the sizes of the particles that produced the same. The duration of each signal is proportional to the time that the particle required in passing through the effective scanning ambit of the sensing zone. The characteristic of these signals that is accurately representative of the size of particles is their amplitude and hence these signals are all changed into signals having the identical duration. The factor of duration thus drops out of the determination to be made. Once having achieved these precision signals, they are required to be converted into representative electrical quantities such as charges, since noncoexistant voltages cannot be added or subtracted. The preferred manner of shaping and switching the signals is in voltage form, because this is the simplest way of doing it electronically and because the charge on a capacitor is proportional to its terminal voltage. Accordingly, when the signals appear at the output channels 64 and 66 they are preferably voltages.

At this point, according to the structure of FIG. 6 the signals are applied to a summing network and voltage pulse-to-charge converter 102. This component, although bearing a rather lengthy name, is quite simple. It need only consist basically of a pair of series resistors connected across the output terminals of the phase inverter 100 and the switch 52, the center point between these two terminals being connected to the input lead 120 of the integrator 102. The resistors will thus change the voltage pulses into currents of precisely determined duration and amplitude, and since these are positive and negative currents they will automatically charge or discharge the capacitors in the integrator to have the desired summing effect.

The integrator 104 may take many different forms. In a theoretical device of basic type such as described in connection with FIG. 4, assuming that a manual threshold control means 38 is used, and only a zero reading is required, the elements of the integrator 104 could be passive. The practical device however, must detect extremely small differences since in the end, it is the small error signal in balancing the currents produced by pulses on 64 and 66 which must produce the output at 68. If it is desired that this error be vanishingly small, the integrator will have to have extremely high gain near zero frequency.

It would be well at this point to take note of the fact that inasmuch as many of the functions of an integrator can be performed by a simple resistance-capacitance combination or a low-pass amplifier having gain inversely related to frequency, these imperfect forms may accordingly be referred to herein as integrators despite their lack of "infinite" memory or time constant. The term "integrating amplifier" is used occasionally herein in order to call attention to this practical equality. As a matter of practical fact, although a "perfect" integrator functions well in any of the block diagrams of FIGS. 4 through 9, 11, and 13, which call for one or more accumulating means, the imperfect forms will function for the most part just as well. For the purposes of this application, therefore, the terms "integrator" and "integrating amplifier" will be considered synonymous and will be used interchangeably.

Figure 7:
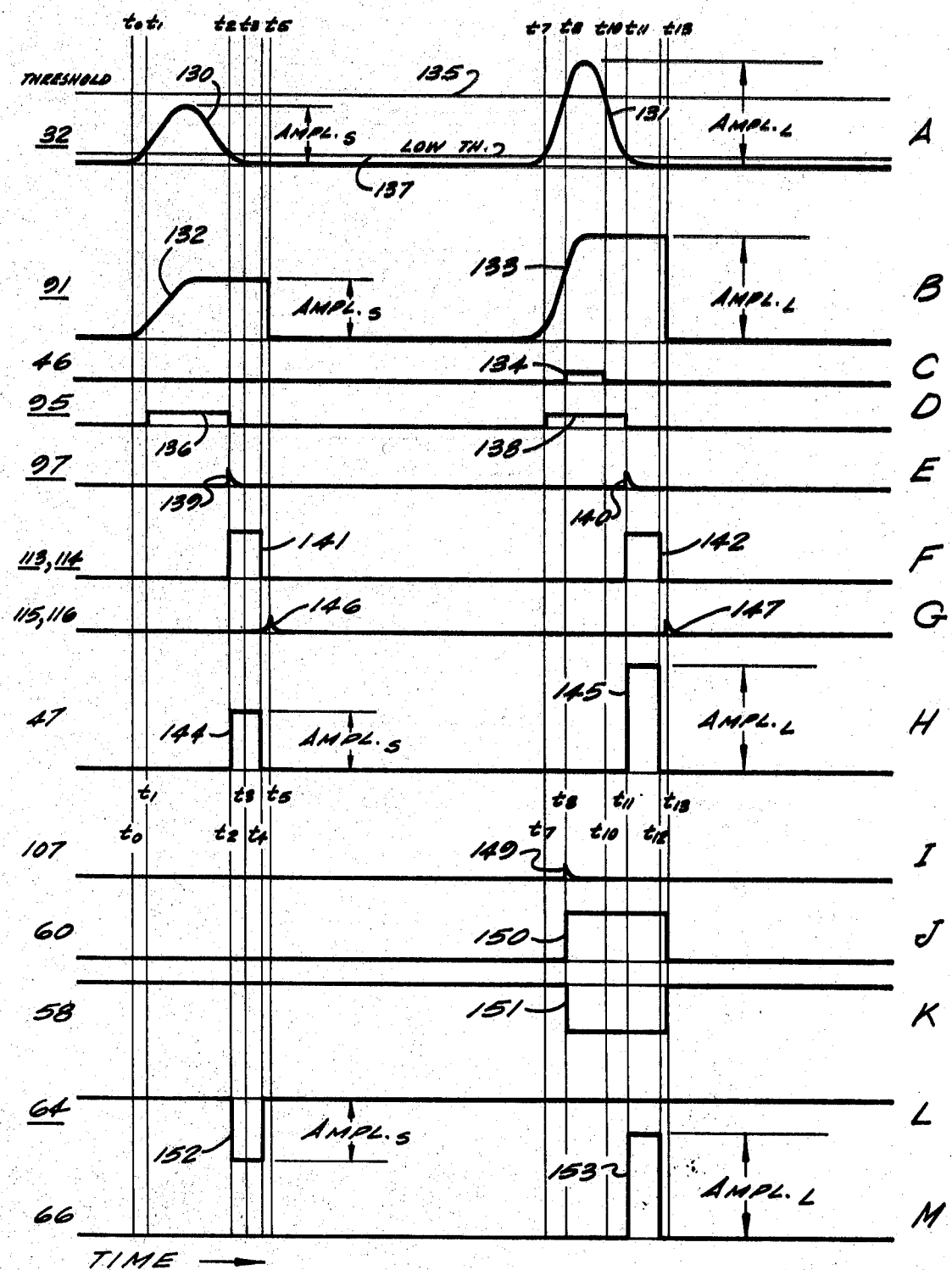
FIG. 7 is a series of charts, all on the same time scale, showing the shapes of pulses in the apparatus illustrated in FIG. 6.

FIG. 7 is a series of wave shapes representing the course of a pair of pulses passing through the apparatus of FIG. 6. At A there are shown a pair of separately occuring electrical pulses due to passage of particles through the signal producing means, these pulses being designated 130 and 131, the latter occurring later and being of greater amplitude, hence being caused by a larger particle. The pulses shown in FIG. 7A occur at the lead 32. The lead 86 connects the signal producing means 30 with the pulse stretcher 90, and the output of the pulse stretcher due to the two pulses 130 and 131 comprises the expanded or stretched pulses 132 and 133, respectively. Note that the leading edge of the stretched pulses fairly well follows the leading edges of the respective pulses 130 and 131, but when these latter pulses subside, the maximum amplitudes reached are retained by the circuit 90 so that the output at 91 is shown in FIG. 7B. The amplitude is marked S on the left hand pulse, for small, and L on the right hand pulse for large.

In FIG. 7C there is illustrated a rectangular pulse 134 occurring from the time t8 to the time t10. This is the period of time during which the pulse 131 exceeded the threshold level 135 established in the threshold circuit 34. Note that there is no equivalent rectangular pulse for the smaller particle-produced pulse 130 because this latter pulse did not exceed the threshold 135 at any time during its occurrence. The pulse 130 has a duration from time t0 to t5 but crosses the low threshold circuit 94 only from the time t1 to t2. This excludes from the circuit noise and very small pulses which are not important such as those produced by a family of very small particles which is of no interest. The output from the low threshold circuit appears as a rectangular pulse 136 in FIG. 7D. The low threshold level is shown at 137 in FIG. 7A. It would usually be at a lower level than apparently shown, i.e., much closer to the base line, but is elevated here for purposes of illustration. The pulse resulting from the larger particle-produced pulse 131 which emerges from the threshold circuit 94 is shown at 138 in FIG. 7D occurring between the time t7 and t11.

Following the lower pulses, that is, those which occur in the delayed precision pulse shaping means 36 of FIG. 6, each of the pulses 136 and 138 has its trailing edge detected in the detector 96, thus producing the trigger pulse outputs 139 and 140 at times t2 and t11, respectively. These trigger pulses occur at the line 97 and are shown in FIG. 7E. They activate the one-shot multivibrator 98 to produce the rectangular switching pulses 141 and 142, occurring at the lines 113 and 114, and between the times t2 and t4 for the smaller particle-produced pulse, and the times t11 and t12 for the larger particle-produced pulse 131. These pulses 141 and 142 are applied to the precision electronic switch 92 and to the trailing edge detector 110.

At the precision electronic switch 92, the pulses 141 and 142 delineate specific portions of the stretched pulses 132 and 133 occuring between times t2 and t4 for the smaller and the times t11 and t12 for the larger, so that the output at 47 from the precision electronic switch comprises the pulses 144 and 145 shown in FIG. 7H. The amplitudes are identical, respectively, to the amplitudes of the pulses 130 and 131, namely Ampl. S and Ampl. L, respectively. The maximum amplitude measurements are accordingly preserved, but now occur in precise rectangular waves more readily handled than the pulse 130 and 131. They are also delayed with respect to 130 and 131 to facilitate setting the switches which direct them over the desired paths.

The trailing edge detector 110 will produce trigger pulses 146 and 147 at the lines 115 and 116, these being delayed from the time t4 to t5 in the case of the smaller particle-produced pulse 130 and from the time t12 to t13 in the case of the larger pulse 131. The reason for the delay, as explained, is to assure that the complete pulses 144 and 145 have terminated, before resetting the flip-flop 108 and the pulse stretcher 90. The trigger pulses 146 and 147 are reset pulses, as noted.

Reverting now to the rectangular pulse 134 which is the output from the threshold circuit 34 and occurs at 46, and then only as a result of the occurrence of the larger of the particle-produced pulses, the leading edge of this pulse is detected in the detector 106 resulting in a trigger pulse 149 occurring at the time t8 shown in FIG. 7I, at the line 107. This trigger pulse triggers the flip-flop 108 causing the same to produce a rectangular pulse 150 commencing at the time t8, and of an amplitude representing saturation of the circuit. The pulse 150 is discontinued at time t13 by the trigger pulse 147, so that the output wave 150 occurring at line 60 shown in FIG. 7J will be a precise rectangular wave. At the same time, voltage at output 58 drops to zero to produce a "negative pulse" 151 of the same duration, as shown in FIG. 7K and is applied to the precision switch 99. It will be appreciated that pulses 150 and 151 are gating pulses, applied respectively to the switches 52 and 54.

Since the switch 54 is normally on, except between the time t8 and t13, the pulse 144 readily passes through, is inverted by the phase inverter 100 and appears at 64 between times t2 and t4 as a negative going rectangular pulse 152, FIG. 7L. Likewise, the pulse 145, being applied to the upper switch which is gated on for the period between times t8 and t13, will pass through the switch 52 and emerge at 66 as a positive going pulse 153 between the times t11 and t12. The amplitudes of the respective pulses 152 and 153 are Ampl. S and Ampl. L, although the first pulse is negative.

These two pulses are applied to the summing network 102, which may be a simple two-resistor network and emerge at 120. This converts the voltages to currents which flow into the integrator 104 by way of the connection 120, and thus place charges on the integrator which are proportional both to the amplitudes of the respective precision pulses 152 and 153 and their durations, and hence proportional to the sizes, respectively, of the particles causing the same.

The integrator output occurs at 68 as a voltage whose level fluctuates responsive to the currents being produced due to the continuous occurrence of pulses from the particles. The time constant of the integrator is chosen to provide the required amount of smoothing, and its output used to drive an indicating device such as the voltmeter 122 calibrated to give dividing particle size. This is threshold level suitably calibrated. The percentile defining the dividing size is determined by the ratio of the resistors of the summing network, and this may be fixed for any desired value or variable with suitable calibrated controls. Likewise, the variable threshold circuit may be varied manually with a suitable calibrated control or may be automatically varied by means of a feedback signal derived by way of the line 72 from the output 68 of the integrator.

In FIG. 5, if the comparing circuit resistive elements are equal, and the threshold is varied by means of the control 38, either manually or automatically, until the read-out at 70 is zero, the calibrated indicator and dial 42 and 44 will give the dividing particle size representing the 50th mass percentile or mass median. In this case, the read-out need not be anything more than a null indicator. If the ratio of the comparing circuit is changed as described to provide other than equal response from pulses of identical size arriving at its two inputs, then a null at 68 will represent a condition in which the particular percentile is equal to the relative response. For example, if the response of the smaller relative to the larger is three to one, then the threshold control means will give the dividing particle size which is the 25th percentile, and so on. The apparatus constantly seeks the condition in which the "up" current is equal to "down" current, so that adjusting gain in one channel gives a method of applying a multiplier factor to enable finding any desired percentile dividing particle size.

In FIG. 6, the same principles apply, except that in this case since the comparing circuit has substantial gain, the read-out 70 may be a voltmeter, giving the control of percentile to the ratio of resistances in the summing circuit, or on the other hand, it can furnish the feedback needed to control the threshold circuit 34. In FIG. 4 the connection 72 shown in broken lines is normally not practical because there is insufficient voltage for feedback purposes. Accordingly, FIGS. 4 and 5 contemplate primarily manual control of the threshold. FIG. 5 has means such as at 53 which enable ready modification to provide automatic control by feedback.

As indicated above, it is not essential that the entire population of a given particle system be scanned, depending upon the nature of the system. Suppose for example that a particulate system is of a type in which there are many fine particles which cannot be accurately measured by the Coulter apparatus being used, either because the aperture being utilized is too large, the electronic circuitry is not of a suitable type, or for some other practical reasons. In such case, the method and apparatus previously described, in which the entire system is scanned and the resulting pulses divided into two channels, may not be practical. In another case, where the particle system has such wide dynamic range that the size of the aperture to obviate clogging from the larger particles must be so great that there is no sensitivity to the smaller particles, the prior method may not be practical.

The method which uses information from "outside" sources, that is, other than from the apparatus itself is suitable for ascertaining the dividing particle size for any percentile, and in some cases must be used. In these latter cases, it will be seen from the description below that some gross method must be involved in obtaining information concerning the total mass of the particulate system, and accurate dilutions must be made. An important advantage of the first method described above is thus lost, since in such first method, no accurate dilutions need be made. It is essential that the apparatus be capable of scanning all of the different size particles of the system that contribute significantly to the mass. If this can be done by the use of scanning means having one aperture, the first method is the best. Another method and apparatus will be described below where the scanning means includes a plurality of apertures for covering different ranges of a system, enabling the use of a modified form of the first method and apparatus.

In the method and apparatus which utilizes outside sources of information, data on the mass of the particulate system is obtained by some gross means, a reference signal produced, and by scanning a dilution and using a particular threshold, the compared output and reference signals will provide the desired dividing size.

As an example, if a powder of known density it is desired to investigate has been carefully weighed to obtain its unit mass, and an accurate dilution is thereafter made, the mass concentration per volume of fluid may be ascertained. Using this dilution, an analogue signal may be obtained by suitable means, suitably attenuated or decreased, and compared with the signal output from the scanning means. If the decreased analogue signal is known to represent half or any other fraction of the mass, when the output from the scanning means is balanced against the decreased analogue signal the dividing size may be read from some suitable indicator connected with the circuit. This will be the size representing percentile mass equivalent to the fraction of the whole defined by the reduced reference signal. The output from the scanning means is obtained by means of the variable threshold apparatus described above, and provides a comparison signal or current representing all particulate mass above the threshold level, so that only particles of a size greater than that defined by the calibrated threshold level will contribute to the current.

In order to obtain information which is valid, the apparatus described must first be calibrated, and this is simply done with a particle system or sample which is known to have only particles which will be detected by the Coulter apparatus. Such a calibrating particulate system would be one in which the particles are very closely monosized, or if of different sizes, have a narrow size range within the optimum size response of the Coulter apparatus. Such procedure will establish the reference voltage, or current derived therefrom, which represent the 100 percent, 50 percent or other mass percentile. Comparison of signals obtained from an unknown sample passing through the Coulter apparatus with the reference will provide the desired information, by adjusting the calibrated threshold of the Coulter apparatus. Stating this in another way, two methods are used to obtain a measure of the total particulate volume or mass, these being a gross method and a one-by-one method (Coulter). Thereafter, the unknown is measured against the reference established by the first procedure.

Figure 8:
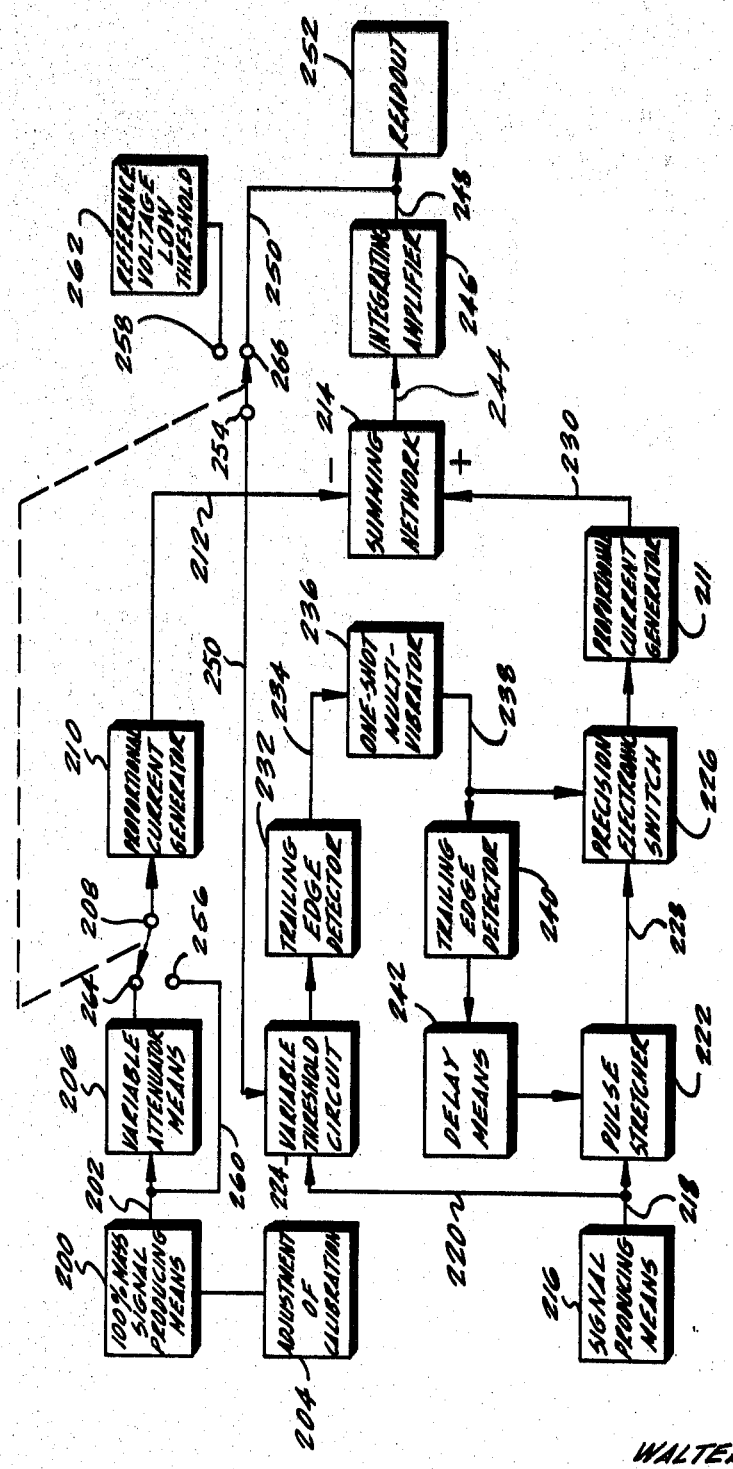
FIG. 8 is a block diagram of apparatus constructed in accordance with the invention in which of the two quantities compared to ascertain their relationship, one is furnished by apparatus operating on a gross method to provide a signal proportional to total mass, while the other is derived from Coulter apparatus using a variable threshold calibrated to give particle size.

Referring now to FIG. 8, apparatus is there illustrated for measuring the dividing size representing any mass percentile point in a particulate system, which uses a gross measurement of the system mass along with the Coulter apparatus. The upper portion of the circuit shown in blocks is that portion which provides a reference voltage related to the mass of the system, suitably calibrated to enable comparison with information obtained from the bottom portion of the circuit.

The block 200 is a signal producing means such as for example, some form of conductivity cell which will provide an output at 202 as a D.C. voltage proportional to particle mass. Such a device could operate on the principles disclosed in British Pat. 973,807. The block 204 represent means to adjust the output at 202. The signal from 202, being a voltage level, may be decreased by the attenuator 206, passed through the switch 208 to the proportional current generator 210 to enable a current to flow by way of the line 212 to the summing network 214. This current is shown to be negative so that it may be balanced against a positive current.

The signal producing means 216 may comprise a particle analyzer, such as a "Coulter Counter" whose output signals are applied by way of the lines 218 and 220 to the pulse stretcher 222 and the variable threshold circuit 224, respectively. The circuit following the pulse stretcher 222 is the precision electronic switch 226 receiving the stretched pulse at 228 and applying a precisely defined portion of the stretched signal through a proportional current generator 211 and a line 230 to the summing network 214. At the same time, the signal produced by the threshold circuit has its trailing edge detected by the detector 232 to provide a trigger pulse at 234 driving the one-shot multivibrator 236. The output at 238 defines the duration of the precise rectangular pulse out of the one-shot 236 and by means of a trailing edge detector 240 through a delay means 242 resets the pulse stretcher 222. The details of the operation are not substantially different from those described in connection with the apparatus disclosed hereinabove. The proportional current generators 210 and 211 are nothing more than series resistors and were considered part of the summing network in the homologous network 102 of FIG. 6. They are shown separately here to emphasize the fact that the input to an integrator should be in the form of current (which, as previously mentioned, when flowing for an accurately determined short time transfers a proportional charge).

The summing network provides an output at 244 which is integrated in 246 to give a voltage at 248. This voltage is applied to threshold circuit 224 which hunts to establish a null at 244 as in previously described circuits, and the threshold level, suitably calibrated, reads the mass percentile dividing particle size that takes into consideration the value of the adjustment of attenuator 206 and the ratio of the resistors the proportional current generators 210 and 211 in the branches of the summing network. If, for example, the resistances of 210 and 211 are equal, and the attenuator is set at one half, then the condition of the threshold circuit is that its calibrated level represents the mass median when the output at 244 is minimized. By suitable feedback through the line 250, the threshold may be self adjusting and the readout device 252 is used to ascertain the proper value of threshold level, calibrated to read particle size.

In the calibration of the apparatus, the following procedure may be followed:

Initially, a quantity of material of some kind is prepared as a calibrating slurry. The only qualification of the material is that it is of a type such that all sizes of its particles can pass through the apparatus comprising the signal producing means 216 and be completely scanned. For example, a monosized system of polystyrene particles would be excellent, although other materials such as pollens or previously sieved powders may be used whose particle sizes occupy a relative narrow range. With the switches 208 and 254 connected to the terminals 256 and 258, respectively, these being calibrating positions, the slurry is placed in the signal producing means 200 while a known dilution of the slurry is scanned in the apparatus 216. This dilution would be chosen to provide the desired freedom from the effects of simultaneous passage of particles through the sensing zone of the Coulter apparatus. The output from the signal producing means is a D.C. voltage appearing at the output 202 and the line 260 which bypasses the attenuator 206 and is converted into a current by the converter 210 to appear at 212. At the same time the threshold of the circuit 224 is set at some low value just above noise by connecting the left-hand portion of the line 250 to the reference voltage 262.

Under these conditions the signal at 230 will represent a voltage proportional to 100 percent of the mass of particles in the dilution passing through the signal producing means 216, and the current at 212 will also be a value representing 100 percent of the volume of particulate matter in the slurry. By adjusting the variable control in 204, the output from the signal producing means 200 is changed until the signal at 244 is zero. Alternatively, the sensitivity of the signal producing means could be altered. At this point, the apparatus has been calibrated.

Thereafter, a sample of an unknown material is diluted to the precise dilution as that used in calibrating the apparatus and caused to pass through the signal producing means 216. At the same time a slurry of this unknown material placed in the signal producing means 200. The output at 202 is switched back through the attenuator 206, which may now be adjusted for any percentile value. The switch 208 will be on the terminal 264 as shown and the switch 254 will be on the terminal 266. These are the operating positions of the switches which may be mechanically ganged. The apparatus then operates as explained, the threshold level seeking a value at which the larger portion of the particulate system has a mass as determined by the sensing and measuring system equal to the appropriate fraction of the total particulate mass.

Figure 9:
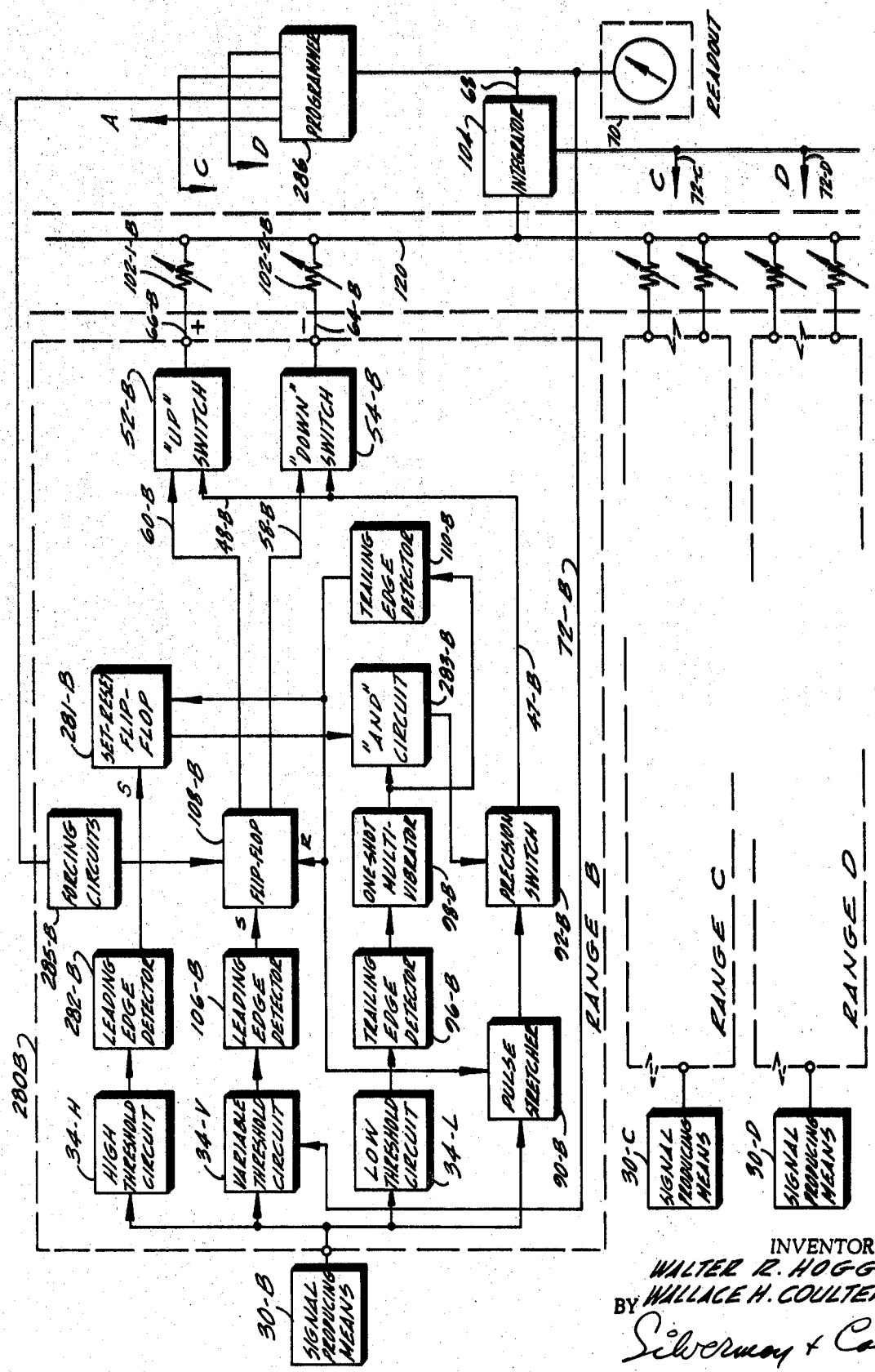
FIG. 9 is a partial block diagram illustrating apparatus in which the signal producing means comprise a plurality of Coulter sensing means, each operating to respond to a different particle size range, the apparatus being adapted to ascertain the dividing size of a system for a certain mass percentile.

In FIG. 9 there is illustrated apparatus which utilizes a modified form of signal producing means in which there is a plurality of apertures, each being designed to handle particles of a different range, so that the actual spread of particle size capable of being handled by the apparatus is increased. Each range has its own circuitry which handles particles within that particular range and has a variable threshold circuit to seek out the size of particle representing the dividing size for the whole system. When anyone range circuit is operating to seek the particular size desired, all of the other range circuits are wide open. Those particle-produced signals with amplitudes less than the threshold, which may be termed the roving threshold, and including the signals derived from the lower ranges all feed their signals into one part of the summing network. Signals which exceed that defined by the roving threshold and those derived from the upper ranges all feed their signals into the second part of the summing network.

The two types of signals, which may be positive and negative, are continuously measured against one another, and when equilibrium is reached, the percentage defined by the constants of the circuit represents the dividing condition, at which time the level of the roving threshold, calibrated in terms of particle size, is the dividing particle size. If the threshold in any one range circuit moves through its limit up or down, a programmer automatically switches to the next range up or down, locking wide open the range circuits not involved in the search, and with the proper polarity. Again, the threshold seeks the condition in the summing network which will result in equilibrium output, and the process continues until the desired value is found.

In FIG. 9 the signal producing means comprise several structures which may be of the Coulter type, these being designated 30A, 30B, 30C and so on, designated the signal sources for channels A, B, C etc. respectively. 30A is not shown, and it may be presumed that there are $n$ channels. Each range has structure identical to that enclosed in the block designated 280-B. There are several blocks shown representing the circuits for the ranges B, C, and D. A range which is assumed to be the top one, range A is not illustrated.

Each range circuit has three threshold circuits, 34-H being the upper threshold, defining the highest amplitude signal that the circuit will accept, 34-V being the variable or "roving" threshold, and 34-L being the low threshold, below which no signals will be accepted in the range. The range circuit A which has the largest scanning aperture will not have an upper threshold circuit. The range circuit $n$ will have a lower threshold circuit only to prevent counting noise so that the upper and lower limits of particles which can be handled by the system are not defined.

The high threshold circuit 34-H is practically the only structural component of the range circuit 280-B which differs from that shown in FIG. 5, and hence similar reference numerals will permit substantial equating of elements. The other additional components are the flip-flop 281-B, the leading edge detector 282-B, and the "AND" circuit 283-B and the forcing circuits 285-B. The flip-flops used in this, as in all other block diagrams are of the set-reset type, that is, input commands do not simply cause a change of state, but determine what the following state will be. The purpose of the high threshold circuit 34-H is to define the upper limit of the range. Since the information sought is required to be precise, there can be no overlapping of particle sizes between ranges.

Suppose a particle pulse is produced which is too large to be included in information from range b. The output from the high threshold circuit 34-H passes to the leading edge detector 282-B which produces a short output pulse in the form of a trigger at the beginning of the pulse. This follows since it assumes that the pulse coming into the high threshold circuit exceeded the threshold. The flip-flop 301-B is normally in a condition to apply a signal to the AND circuit, so that any pulse which does not operate the leading edge detector 282-B can pass through the AND CIRCUIT 0*0-B, but if there is a trigger pulse, indicating a high amplitude pulse above the high threshold, the flip-flop 281-B is energized, and the AND circuit 283-B is turned off, thus preventing the pulse generated by one-shot 98-B on command from low threshold 34-L from operating the precision switch 92-B. The operation of the remainder of the circuit is as in the case of FIG. 5, for pulses which exceed low threshold 34-L but not high threshold 34-H.

From the above, it will be seen that the outputs at 66B and 64B will be compared in the summing network elements 102-1-B and 102-2-B to provide a current at 120 which in turn flows into the integrator 104. The feedback path 72B continuously varies the threshold of the circuit 34-V seeking that level which will produce a condition of equilibrium. Obviously this will be a null condition due to servoaction as explained hereinabove. While this is going on, all of the other range circuits are providing current in the line 120, each summing its "ups" and "downs" in suitable elements equivalent to 102-1-B and 102-2-B, so that a state of equilibrium may not be reached with any threshold capable of being established in the circuit 34-V. In such case, it will eventually pass the upper or lower limit of the range, which means that the dividing particle size being sought does not occur in that particular range. Sufficient time will be allowed to ascertain that equilibrium does not occur at, or in a narrow range about either limit, in which case such limit would be read out and the measuring cycle complete. If equilibrium is not reached, the apparatus must now switch to the next range up or down, and have the variable threshold in that particular range seek the desired level. Obviously, when any one range circuit has its channel roving, the variable threshold of all other ranges must be locked to pass all pulses occurring within the respective range with the proper polarity.

The programmer 286 conveniently may be pulsed by the output of the integrator 104 crossing one of the limits defined by the high and low threshold circuits due to no state of equilibrium having been achieved. In any one condition, the programmer 286 operates through forcing circuits such as 285-B in each of the range circuits to cause the connected flip-flop equivalent to 108-B to produce add or subtract signals while one range has its threshold seeking a condition of equilibrium. Alternatively, it may lock the variable thresholds of all ranges not being searched at the same level as the upper or lower thresholds, causing all information to be either added or subtracted. Thus, for example, if range B has its threshold circuit 34-V seeking a state of equilibrium, the programmer will be holding the signals coming from range A to be directed to add, while the signals out of ranges C, D and the other lower ones are forced to subtract. Additionally, the signals above the threshold in range B will add, and those below the threshold in range B will subtract.

In this condition, if the integrator 104 runs below its lower limit, the programmer 286 will be pulsed, switching the ability to seek a threshold to the C range. The A and B ranges will be locked into positive condition, the range circuits D, E and other lower range circuits will all be locked into negative condition, while the output from the C range will be divided above and below the roving threshold. If a state of equilibrium is reached, the value of particle size will be represented by the read-out 70, suitably calibrated. The programmer will also indicate the proper scale on read-out 70. If not, the programmer will again operate when the integrator crosses its lower or upper limit.

It will be appreciated that in apparatus of the type described in connection with FIG. 9, there are certain conditions which are inherent in the structure and which prevent the use of the signals from each of the range circuits without modification of some kind. These conditions may be summarized as follows:

a. In order to utilize the single integrator for seeking the threshold in any of the ranges, its swing will be same regardless of the range in which it is operating. Each range however, does not produce signals having the same value without some weighting or modification. Note that the difference in size between channels may be quite substantial. The small particle pulses would have to be enormously amplified over what they would be if they were only proportional to particle size, compared with those pulses produced by the large particles, and still be controlled by the threshold changes produced in the integrator.

b. If employing a "Coulter Counter," the flow rates through the smaller apertures, for sensing the smaller ranges of particles, will be substantially less than the flow rates in the larger apertures, so that particles are passing through their sensing zones at a different time rate, and accumulating signals at a different time rate.

Because of these conditions, compensating scale factors must be built into the range circuits to compensate for the effects caused. For example, for the slow flow rates of the smaller apertures, the contribution of the signals from those ranges should be multiplied by the ratio of the flow rates. On the other hand, since the smaller particle pulses have undergone much greater amplification than the larger, they should be decreased by the ratio of the overall sensitivities, considering aperture current and amplification.

Convenient ways of doing this weighting is to vary the duration of the multivibrator pulses, such as are produced by 98-B. Fortunately the large particles are usually infrequent, so that the multivibrator pulses in the larger ranges may be made very wide compared with the pulses in the smaller ranges without concern over coincident pulses. Another way of compensating or weighting is by the choice of the resistors 102 in the several ranges. The upper range resistors would be smaller than those in the lower.

The basic discussion above assumes that the mass median is being sought, but the dividing particle size for any percentile of mass can be ascertained by suitable modification of circuit constants. Note the resistors 102 are shown to be variable. Even the operation of the programmer need not prevent such modification. Relays and other circuitry may be used, and will be readily worked out by those skilled in this art.

The basic concept of deriving by the apparatus a number or numbers representing the total mass above and/or below some variable size and applying feedback to cause this variable size to seek an equilibrium condition whereby it becomes the dividing size above and below which the fractions of particulate mass bear a desired relationship to each other or to a quantity derived by means external to the apparatus may also be implemented using digital techniques. The apparatus suggested in block form in FIG. 10 which include identified components well known to those skilled in electronic computer art, is an example of such an implementation.

Figure 10:
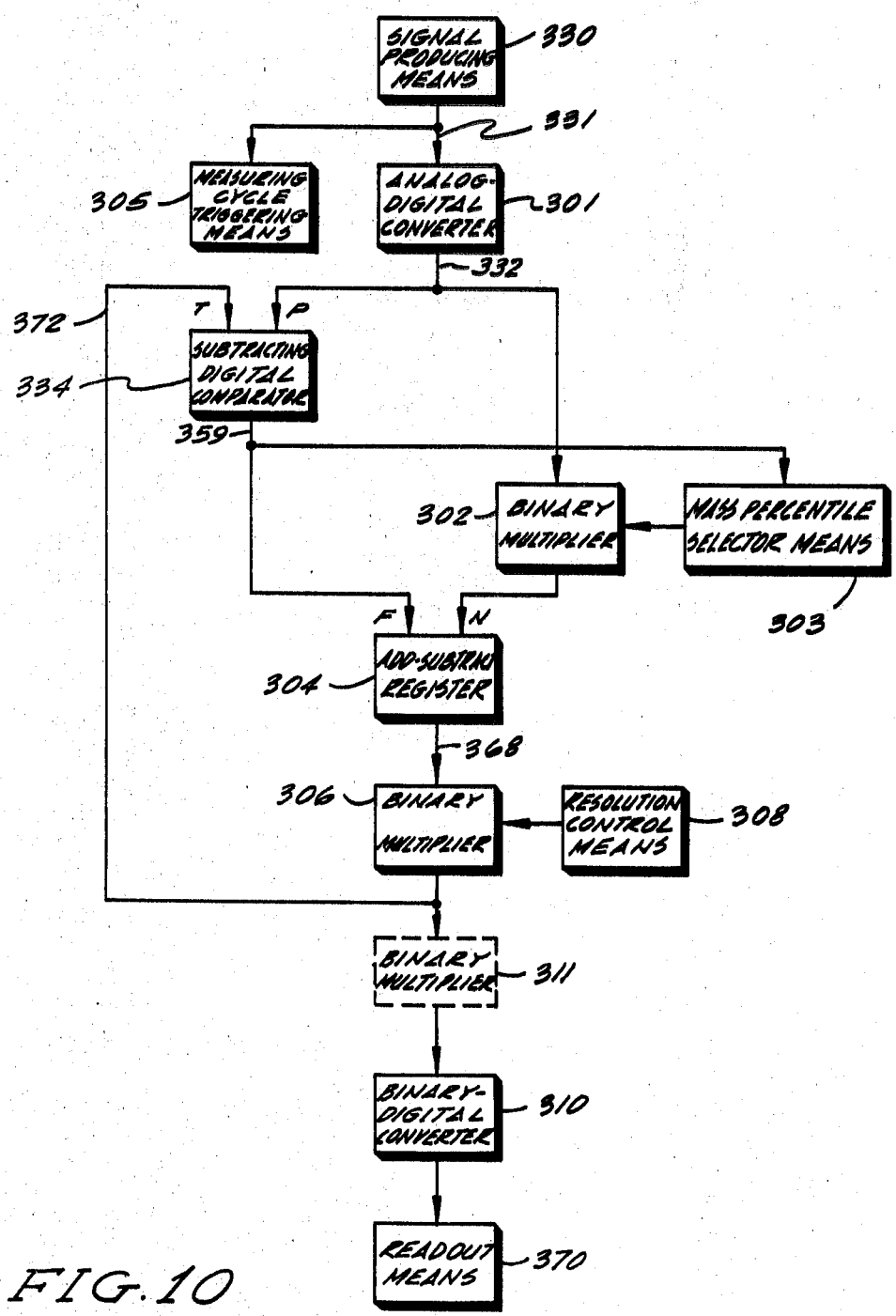
FIG. 10 is a block diagram illustrating a basic apparatus which performs in a manner similar to that of FIG. 6, but which employs digital instead of analogue techniques.

In the apparatus of FIG. 10, pulses produced in the signal producing means 330 are applied to the analogue-digital converter 301 by connection 331. Upon command by the measuring cycle triggering means 305, which may be a low threshold such as described in connection with the previous figures, the analogue-digital converter 301 converts a pulse amplitude (analogue) to a digital code, preferably binary, and, this accomplished, emits at 332, which is actually a multiplicity of wires, the binary coded number representative of the amplitude of the particle-produced pulse, with as many bits as the required precision demands. The connection 332 represents as many wires as there are bits in the binary number; a common return circuit is understood. The conversion from amplitude, which is commonly a voltage, to a binary number can be accomplished in a very short time, for example 10 microseconds. This binary number is thus the homologue of the pulse height in the analogue systems described hereinabove.

The circuit element which determines a measuring level and which corresponds to the variable threshold is the "subtracting digital comparator" 334. This compares by performing a subtraction, the input labeled P representing the particle volume being subtracted from the binary number at the T input. If the difference thus obtained is a positive number, the input P must be smaller than the input T, and the comparator 334 has no output at 359. If however the binary number applied to input P is larger than that at input T, the subtraction results in a negative number, and the comparator is so arranged that it has an output at 359. The output or lack of output at 359 may be designated as a logical "one" or a logical "zero," respectively, Thus the comparator 334 is closely analogous to the variable threshold 34 of the previously described analogue devices such as that of FIG. 6.

The device of FIG. 10 which is the counterpart of the integrator 104 of FIG. 6 and the "up-down" switches 52 and 54 is the add-subtract register 304. This is a device which accepts a binary number at the input N and either adds it to or subtracts it from the number already stored in it according to the state of the logic function input F. In this exemplary device, the binary number at the input N will be added if a logical one appears at input F and will be subtracted if a logical zero appears at the input F. The binary number appearing at the input N is the same as on the connection 332 when a binary multiplier means 302, which is the source to the input N, is adjusted to seek the mass median of the particulate system, as will be assumed in the discussion immediately following; the binary multiplier 302 is used in finding mass percentiles other than the 50th as will be considered later. Until then, it may be assumed that it multiplies by unity, it provides a multiplication factor.

Accordingly, the number stored in the add-subtract register increases if the number at the input T of the comparator 334 is smaller than the mass median since the majority of inputs at turn-on are being added, and decreases if the reverse is true. The output of the add-subtract register 304, which is the difference between the running totals of the masses above and below the measuring level, is fed back via connection 372 to the comparator 334, establishing the measuring level. Due to the feedback action, the measuring level changes until it finds an equilibrium condition at which the two fractions have the desired relationship. In the case of the mass median, these fractions are made to be equal. When equilibrium has been reached, the number appearing on connection 372 is the desired particle size. This binary number may be converted to decimal form by the binary-to-digit converter 310 and read out by the read-out means 370 which might be a tape or card printer or one of the many available alphanumeric or numeric indicator devices. A computing circuit 311 might conveniently be included to perform the calculation $d = k\sqrt[3]{\frac{6v}{\pi}}$ where d is the equivalent spherical diameter of the mass median particle size or other percentile, v is the corresponding particle volume as measured, and k is a factor of proportionality dependent upon the size of the sensing zone, strength of the particle sensing zone excitation, gain of the associated amplifiers, and the increment of volume represented by a binary bit.

The binary multiplier 302 inserted between the analog-to-digital converter 301 and the add-subtract register 304 serve the same purpose as did the resistances 102 in FIG. 9, that is, to weight one of the channels in such a manner that when equilibrium is found, the two mass fractions, instead of being equal, have the ratio one to the other which will cancel the upset produced by the deliberate asymmetry thus produced. In the same manner as before, if it is desired to find the 25th or 75th mass percentile, for instance, all the particles above or all the particles below the measuring level are made to contribute three times or one-third the natural count to the add-subtract register. Whether the larger or the smaller of the particles are weighted is controlled by the mass percentile selector means 303, which, depending upon whether or not it receives a logical one from the comparator 334, multiplies the binary number on connection 332 by the factor selected by selector means 303 or transmits it unchanged, or by a different factor also selected by the selector means 303. By using the appropriate multiplying factor equilibrium will be reached for any desired mass percentile.

The binary multiplier 306 serves to adjust the resolution in much the same manner that the storage capacity of the integrator 104 determines the rate at which equilibrium is found and the degree to which the random arrival of particles causes the final output to fluctuate in the analogue apparatus of FIG. 6. This multiplies the signal by a factor smaller than one and operates by permitting the add-subtract register output to fluctuate between wider limits for a given excursion of the measuring level established on connections 372. The factor is selected by resolution control means 308. Both the binary multiplier 306 and the binary multiplier 302 may simply shift the binary point, effectively performing a multiplication or division by some selectable power of two.

The inclusion of other adjuncts and refinements in apparatus built according to the principles of the invention does not constitute departure therefrom. An example of such an adjunct, although it does not appear on any of the figures, would be means for eliminating the above-mentioned fluctuation of the output indication for a given reading, such means consisting of an accumulator which integrates the output for a specified period of time, thereafter providing a static indication of the average output for that period of time.

The digital technique used in this apparatus could of course be extended to develop a counterpart of any of the other analogue apparatus described herein, but it is believed that those skilled in the art will readily be able, following the principles disclosed, to perform these extensions without further discussion here.

Even other apparatus for achieving the basic principles of the invention may be devised. As further examples, attention of the reader is directed to FIGS. 11 through 14, describing two further devices which employ different means of performing the separation and accumulation of the quantities representing particulate mass above and below a dividing size. The same techniques used here may be used in apparatus based on comparison of the "top" of the particulate mass as measured by a Coulter sensing zone with a fraction of total mass as measured by another method, but they will not be illustrated as it will be apparent to those skilled in the art how this may be accomplished.

Figure 13:
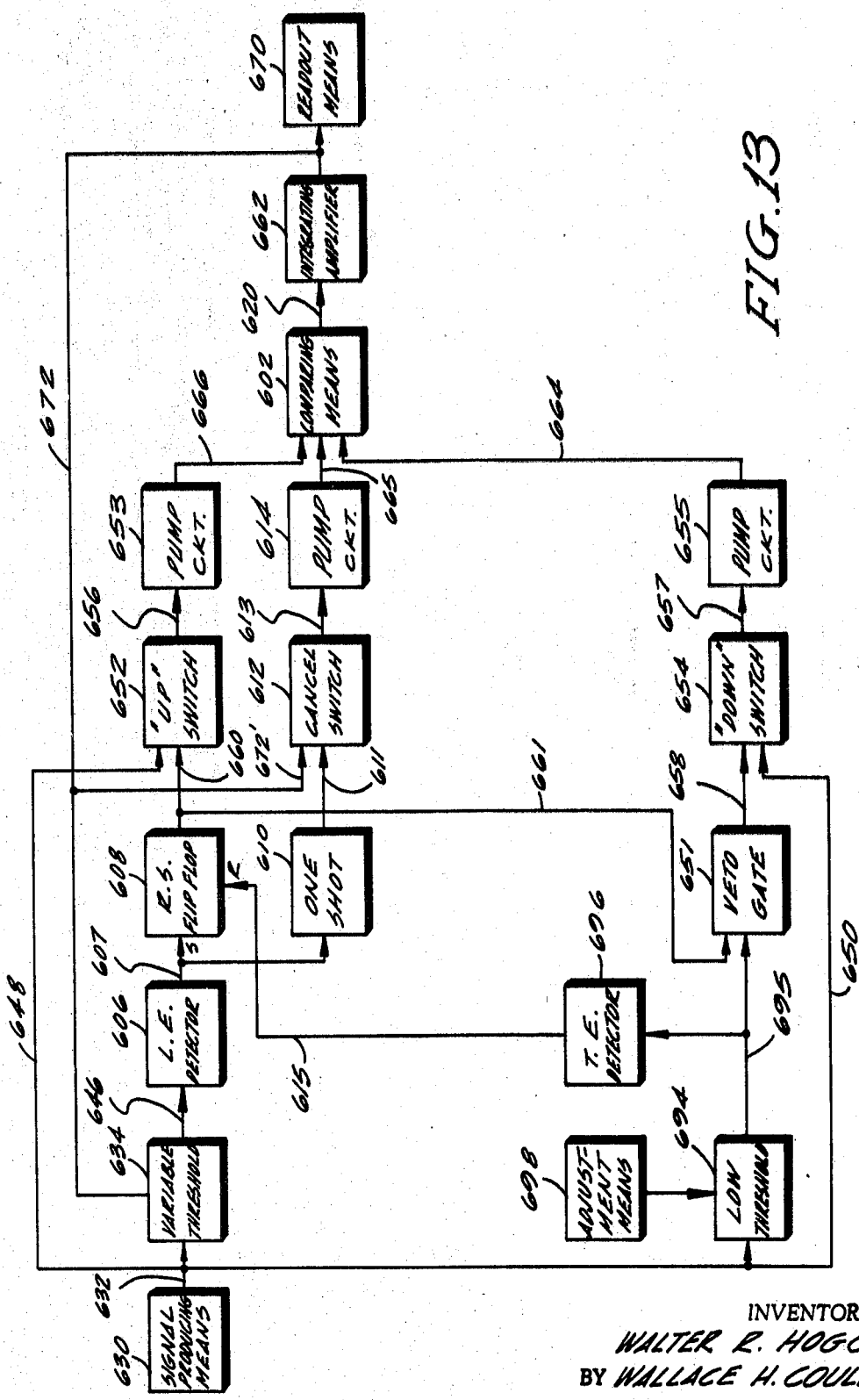
FIG. 13 is a block diagram of apparatus constructed in accordance with the invention in which means are provided to eliminate the need for pulse amplitude information storage means.
Figure 14:
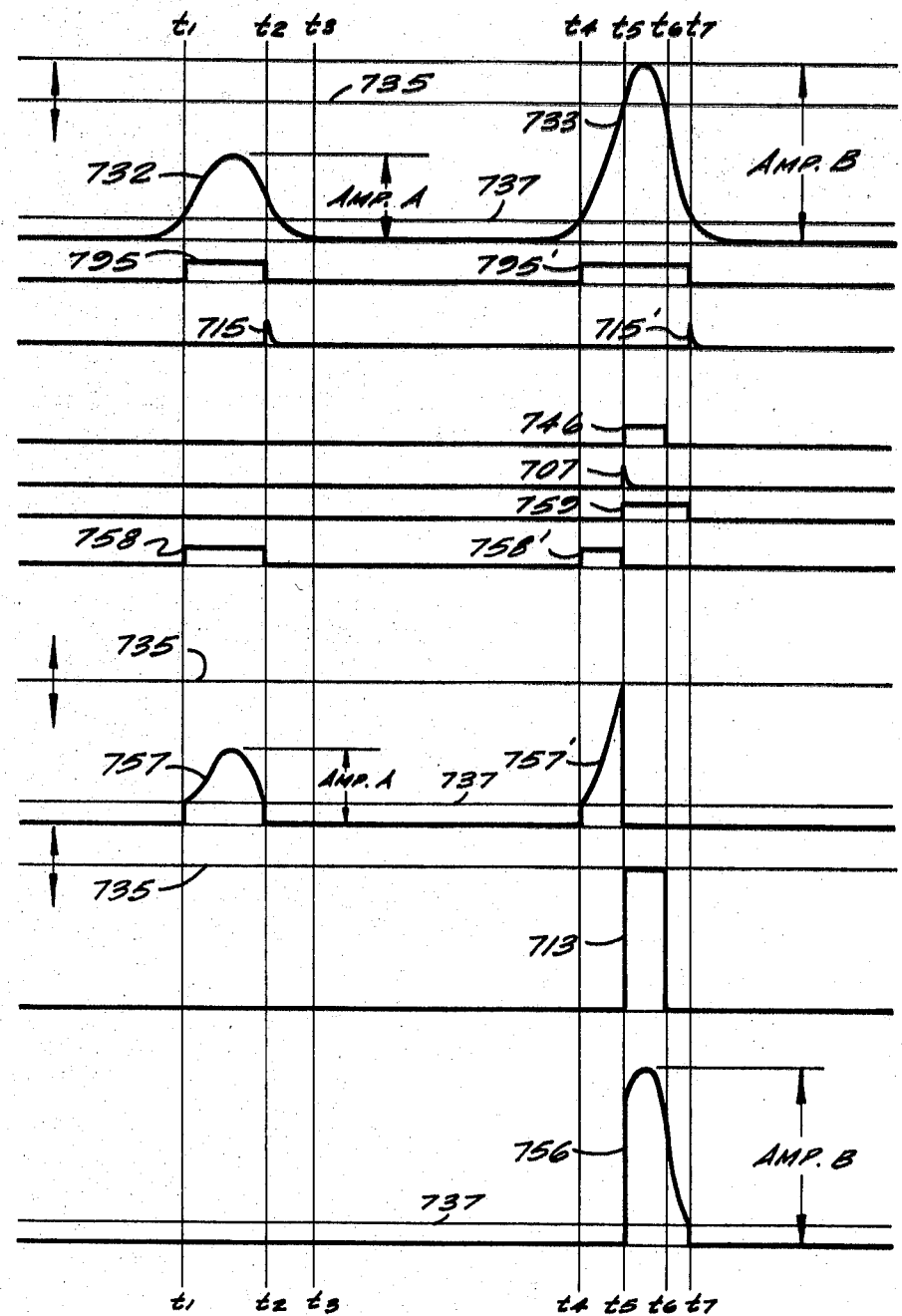
FIG. 14 is a series of waveforms, all to the same time scale, showing the signals appearing on various paths in the apparatus of FIG. 13.

In FIG. 13, no memory device is used as exemplified by the pulse stretchers or delay line of the previously described apparatus. Instead, all pulses are permitted to contribute to the accumulating or summation means, the pulses exceeding the threshold contributing in a polarity sense opposite to those which do not exceed the threshold, due to separation into channels defined above and below the said threshold. The upper channel is called the "up" channel, since it causes the level established to go up, and the lower channel is called the "down" channel because it has the opposite effect. As for the threshold itself, this is established by feeding back the output of the accumulating means, so that the threshold value changes up and down as the case may be in accordance with the respective contributions of the pulses passing through the channels. The difficulty arises with a device of this kind, that for each pulse which exceeds the threshold, not only will there be a pulse in the "up" channel, but also there will be a portion in the "down" channel which represents the portion of the large pulse that existed below the threshold. The circuit cannot initially detect the difference between pulses that do or do not exceed the threshold since nothing occurs in the "up" channel until a large pulse actually exceeds the threshold. Thus, after a pulse has exceeded the threshold, it has already contributed an effect in the lower channel representing its excursion up to the threshold, and this latter effect must be canceled for the feedback information to represent valid accumulation of information from the both channels. The apparatus of the invention provides novel structure for canceling the undesirable effect from the "down" channel so that only the effect from the "up" channel is obtained from pulses which exceed the variable threshold.

The operation of this apparatus may be understood by following the sequence of events which ensue upon the occurrence of a pulse which is smaller in amplitude than the level of the variable threshold, and a pulse which is greater than the level, respectively. Consider first the pulse 732 which has an amplitude Amp A smaller than the level of the variable threshold 735. The first thing which happens is the crossing at time $t_1$ of the low threshold level 737 which is established by the low threshold circuit 694 and its adjustment means 698. This threshold circuit serves to trigger the measurement cycle and is so adjusted that noise and/or particle pulses too small to be of interest have no effect upon the measurement. The low threshold circuit 694 emits at path 695 the pulse 795 beginning at time $t_1$ and ending at time $t_2$. The trailing edge of this pulse is sensed by the small capacitor and diode of the trailing edge detector 696 which produces at its output 615 the trigger pulse 715 of short duration. This trigger pulse is applied to the reset terminal of RS flip-flop 608 but since this flip-flop is already in its reset state nothing happens as a result of this.

At the same time as these events are taking place, the particle-representing pulse 732 is being applied to "up" precision electronic switch 652 and to the "down" precision electronic switch 654 via paths 648 and 650, respectively. However, the control terminals which determine whether or not a pulse will pass through these switches are such that the pulse will pass through the "down" switch only. This is because the output 795 from the low threshold 694 is being applied via a veto gate 651 and its output path 658 to switch 654 and the RS flip-flop 608 has no output at this time, holding switch 652 in its nonconducting state. The "veto" gate 651 is a circuit which has an output 758 on FIG. 14 if and only if it has an input from path 695 and no input from path 661. Since, as we have seen, the RS flip-flop 608 has not output for the pulse assumed, the signal on path 658 is the same as that on path 695.

Since the "down" gate 654 transmits pulses for the duration of the gate input signal 795, the transmitted signal pulse at path 657 will be slightly truncated pulse 757. The rounded parts of the signal pulse near the baseline are missing because the switch 654 was not "on" for the full duration of the pulse 732, but since it is the amplitude only of the signal pulse which is of interest, this is of no concern. The pump capacitor in the simple pump circuit 655 in turn charges up to the signal voltage during the time in which the signal voltage is rising and dumps this charge into the summing point 602 as the signal voltage subsides again to zero, transferring an increment of charge proportional to particle volume to the accumulating means 662 as has already been described in connection with other types of apparatus constructed according to the invention.

Continuing with the discussion, consider now a pulse 733 which is of an amplitude Amp B which exceeds the level 735 of the variable threshold 634. As the instantaneous pulse voltage rises, it again crosses the low threshold level 737 which is set by low threshold 694 and its adjustment means 698 at time $t_4$. As before, the "down" precision electronic switch 654 is turned "on" by the signal 795' on path 658, applying partial pulse 757' to the pump circuit 655 via path 657. As before, the pump capacitor charges up to the voltage at its input. However, at time $t_5$, the signal pulse 733 crosses the level 735 of the variable threshold circuit 634, beginning output pulse 746 at path 646. The leading edge of this pulse is detected by leading edge detector 606 which applies trigger pulse 707 to the "set" terminal of the RS flip-flop 608 initiating control pulse 759, and to the trigger input terminal of the univibrator 610. The control pulse 759 is applied to the up switch 652 and the veto gate 651. Within a very short time, such as a fraction of a microsecond, the "up" precision electronic switch 652 is turned "on" by the signal 759 from the RS flip-flop, the signal proceeding from path 695 to 658 through veto gate 651 is blocked, turning "off" the "down" precision electronic switch 654, and the "cancel" precision electronic switch 612 is turned "on," connecting the input of the pump circuit 614 to the connection 672'. Since the pump capacitor of pump circuit 655 charged to the level of the variable threshold before the premature termination of the particle generated pulse, the charge transmitted to the summing point 602 is the product of the pump capacitor times the variable threshold level. This charge should not have been placed in the accumulating means through the "small particle" channel since it is now apparent that the particle exceeded the variable threshold.

The artificial pulse 713 generated at path 613 by the "cancel" precision electronic switch 612 and the voltage from path 672 is applied to pump circuit 614. This pump circuit is identical to 655 except that the diodes are reversed, causing it to remove charge from the summing point 602 as the input voltage increases, and dump its charge into ground as the voltage subsides, thus producing the opposite effect from that of pump 655. Therefore the univibrator 610 in combination with the "cancel" precision electronic switch 612 and the pump circuit 614 remove just enough charge from the accumulating circuit to obliterate the effect of the erroneous contribution due to the partial pulse 757'.

At the same time, however, the particle-generated pulse 733 is applied to the "up" precision electronic switch 652. When this switch is turned "on" at time $t_5$, the voltage at path 656 rises to the value of the particle pulse 733 giving rise to pulse 756. The pump capacitor in pump circuit 653 is charged to the amplitude of the particle pulse as the voltage increases, and this charge is transferred to the summing point 602 and to the accumulating means 662 in the same manner as is done in the other pumps. At the end of the particle pulse, as the instantaneous value drops at time $t_7$ below the low threshold level 737, the reset pulse 715' is generated in the same manner as was 715, and the RS flip-flop 608 is reset, ready for the next pulse analysis.

Figure 11:
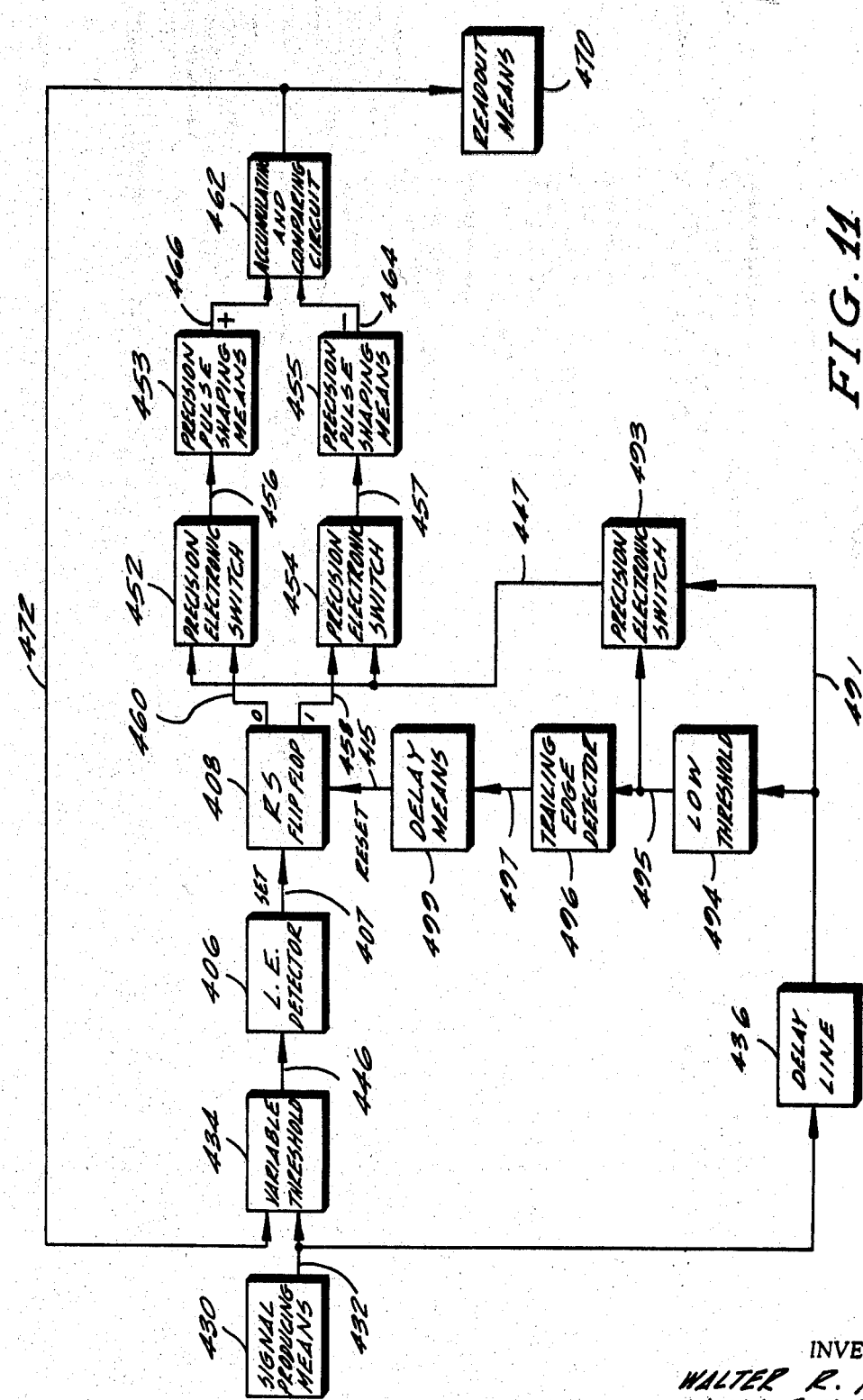
FIG. 11 is a block diagram of apparatus constructed in accordance with the invention in which a delay line is used to store the particle pulse until other portions of the circuit make the decision and operate the appropriate electronic switches depending upon whether the pulse is to be treated as being above or below the dividing size.
Figure 12:
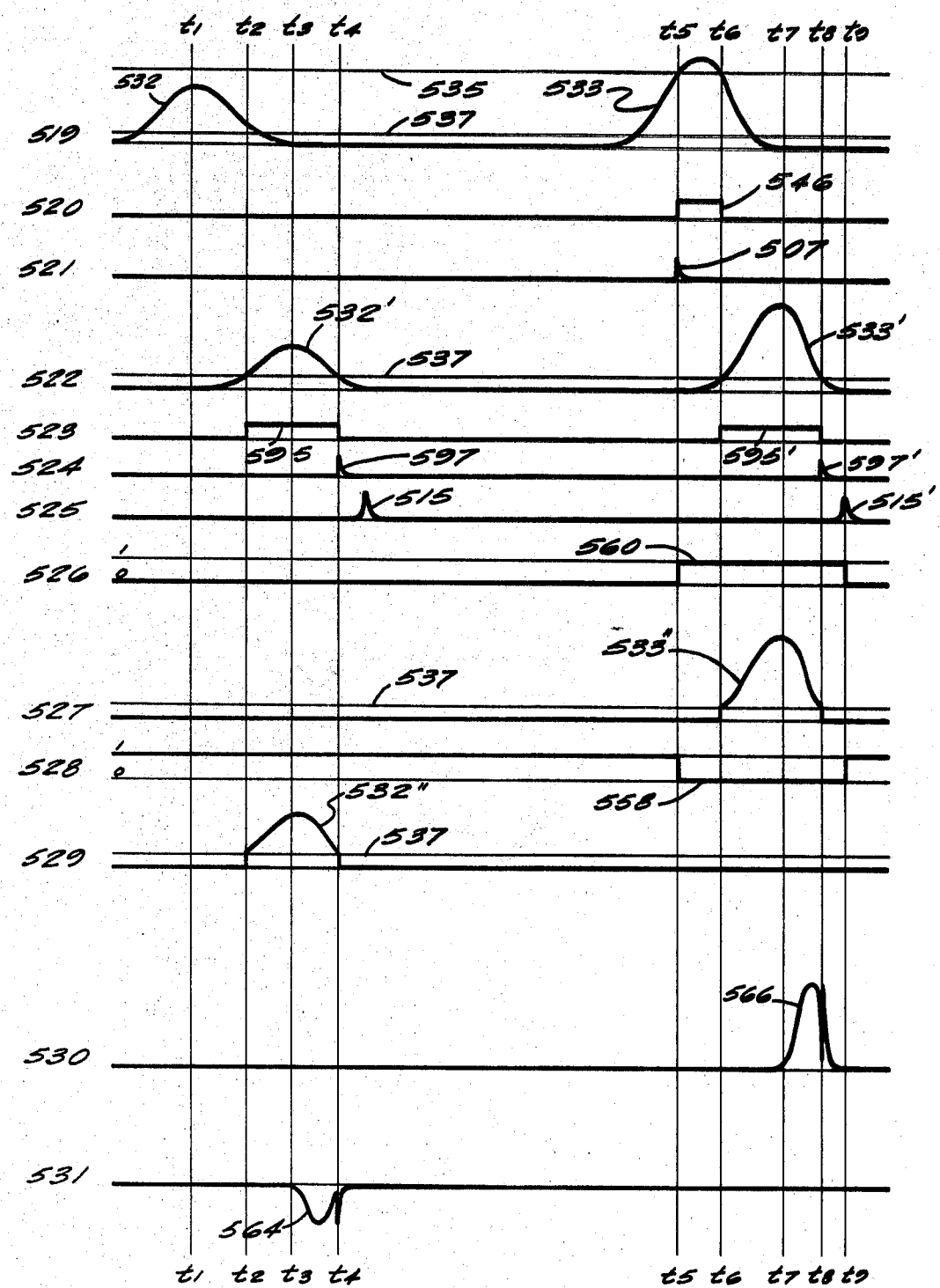
FIG. 12 is a series of waveforms, all to the same time scale, showing the signals appearing on various paths in the apparatus illustrated in FIG. 11.

FIG. 11 is the block diagram of apparatus which obeys the same principle of adding to or subtracting from a quantity representing accumulated particulate mass but employs a delay line to store the signal pulses until a decision has been made which of these operations is appropriate. FIG. 12 is a sequence of waveforms of signals on the various connections of FIG. 11, all to the same horizontal time scale.

The signal producing means 430 is the same for this apparatus as for previous apparatus and will not be described again. Its output 532 at path 432 is applied to variable threshold 434 and to the delay line 436. In order to understand the operation of the apparatus, consider a pulse 532 which does not exceed variable threshold level 535. No output pulse is generated at the output connection 446 of the variable threshold 434 no trigger pulse is generated at the connection 407, and therefore, the RS flip-flop 408 remains in its stand-by state, holding precision electronic switch 454 in a conducting condition.

The same pulse 532 is also applied to the delay line 436, which is properly terminated to preclude reflections. When it emerges slightly attenuated from the delay line 20 or 30 microseconds later as pulse 532' at 522, it is applied to low or acceptance threshold circuit 494, which is set to have an output if a pulse exceeds its threshold level 537. Since the pulse 532' does exceed this threshold level from time $t_2$ to $t_4$, the threshold circuit 494, has an output 595 shown at 523 in FIG. 12 and which appears on path 495 of FIG. 11. This pulse 595 operates the precision electronic switch 493, causing path 491 to be connected to path 447 for the interval included between times $t_2$ and $t_4$. Thus a pulse 532'', shown at 529, is placed on path 447 which has the same amplitude as has pulse 532' and the same duration as pulse 595. This pulse 532'' is then applied to both precision electronic switches 452 and 454. These switches may consist essentially of field effect transistors in series with paths 491, 447, 456 and 457, the gates of which are biased appropriately by the signals 595, 560, and 558 on paths 495, 460, and 458, respectively. It will be apparent to those skilled in the art that two electronic switches would suffice, namely 452 and 454, with signals at paths 447 and 460 anded together to provide the control signal to switch 452, but it is believed that the connection illustrated is more consistent with the language used in the application, and that the resultant symmetry and step-by-step operation will make the explanation more understandable to those less familiar with such techniques. Whether such simplification is made or not, the basic structure and methods of the invention, as defined in the appended claims, will be adhered to.

Continuing with the discussion, the pulse 532'', although it is applied to both electronic switches 452 and 454, can pass through only switch 454 since RS flip-flop 408 is holding switch 452 in its nonconducting state, as indicated by having the signal 560 shown at 526 of FIG. 12 and appearing on path 460 of FIG. 11 in its "zero" state, which is to say that there is no signal there. When the pulse signal 532" emerges from electronic switch 454 it is applied to the precision pulse shaping means, which in this case is presumed to be a pump circuit, by means of connection 457. While the pulse signal is increasing, the capacitor of this pump circuit charges through the included diode to ground, and when the signal subsides, the charge flows out of the pump through connection 464 and into the comparing and accumulating means 462, causing a current to flow in this connection which is of the waveform shown as 564 at 531 of FIG. 12. The area of this pulse 564 is indicative of the charge transferred. Since the charge stored in a capacitor is numerically equal to the product of its capacitance and terminal voltage, this charge is representative of the volume of the particle which produced the signal pulse, irrespective of the duration of the signal pulse, as is desired. It has such a polarity that the output signal from the comparing and accumulating means is lowered, lowering in turn the threshold level 535 of the threshold circuit 454 by means of the feedback connection 472 in the same manner as has been described in connection with other embodiments of the invention.

Consider now the action which takes place when a pulse occurs which does exceed the level 535. Such a pulse is illustrated by waveform 533 at 519 of FIG. 12.

The pulse 533 exceeds the level 535 of the variable threshold 434 as determined by the feedback voltage 472 as in the other illustrated variations of the apparatus, generating the output pulse 546 at connection 446 which has a duration equal to and simultaneous with the time the instantaneous value of the pulse 533 exceeds the said threshold level. The leading edge of the pulse 546 is detected by leading edge detector 406, producing at 407 the trigger pulse 507 which is used to change the state of the RS flip-flop 408, as shown by the signal 560 appearing at connection 460, and causing electronic switch 451 to conduct, and switch 454 to block pulse arriving via path 447. This flip-flop is homologous to the RS flip-flop 108 in FIG. 6.

The pulse 533 is also applied to the delay line 436 via path 432, from which it emerges with negligible distortion 20 or 30 microseconds later. This delay line is designed to provide a delay sufficiently long to ensure that if a pulse does exceed variable threshold level 535, no part of it will emerge from the delay line before the various switches have been properly set. Since this RS flip-flop 408 is now holding precision electronic switch 452 in its conducting condition and switch 454 in its nonconducting condition, the delayed signal pulse 533' is routed to the precision pulse shaping means 453. This circuit is also a "pump" circuit in this variation of the invention, but its diodes are connected in reverse polarity to those of its small-pulse counterpart 455, such that the stored charge which represents the volume of this large particle represented by pulse 566 tends to cancel that which represents the smaller particles. The current pulse 566 which represents the transfer of this charge to the comparing and accumulating means is accordingly shown with opposite polarity to that of pulse 564. As in the apparatus described by the previous figures, the net charge or current is used to vary the threshold charge until a condition of equilibrium is found at which the net charge or current into the accumulating and comparing circuit 462 approaches zero. Also as in the above-mentioned apparatus, the relative weights of the two opposing pulse shaping means may be chosen to cause the threshold level at equilibrium to represent any other desired mass percentile.

In the discussion above, and as well in the claims which follow, the expression "particulate system" is used, and in order to avoid any misunderstanding, the meaning of such expression might be defined here. This can be done by describing several systems which are capable of being investigated by the apparatus and method of the invention.

Consider a system which has a very wide dynamic range, and in which there are very large particles, as well as particles which are so small as to be practically submicroscopic. For example, suppose that these small particles are of the order of .5 micron and that a substantial quantity of the mass of the system lies below .5 micron. Coulter aperture tubes as commercially available are not readily usable to investigate such total systems. In this case, the apparatus of FIGS. 4, 5 and 6 may not be as useful as that of FIG. 8 which uses some gross measurement to define a fractional part of the mass. The latter structure thus has two different sources for the information compared. Obviously, where the complete source of information depends upon Coulter apparatus the particulate system referred to would not include such submicroscopic particles. Indeed, the system might best operate with a low threshold to exclude pulses due to these tiny particles, since they might be lost in the inherent noise of the system. Also, the size of aperture to give good sensitivity in an attempt to obtain a response to such small particles would itself be so small as to give rise to frequent clogging, although with such a system as depicted by FIG. 9, it would be possible to "scalp" which is to remove by sedimentation or otherwise the particles in any of the smaller aperture ranges which would be ignored by the corresponding electronics anyway.

The apparatus of the invention as a general rule will have some low threshold for practical purposes, and since this is obvious from the specification, it may be assumed to be included in any apparatus investigating a system by the use of Coulter sensing means and operating at the smallest limit of particle size.

Another type of particulate system would be one in which the entire range of particles from the very smallest to the very largest is capable of being measured by one or more Coulter apertures so that a gross measurement is not needed. Both ends of such a system would be open, so far as the apparatus is concerned, but for practical purposes there will probably be a low threshold.

From the specification, it will be seen that a portion of a total system may be investigated between certain defined limits. Thus, a pair of thresholds before the apparatus may define a specific range of sizes outside of which there is no interest. This investigation, therefore, does not contemplate looking at particles larger than the upper limit of the specific range or smaller than the lower limit of the specific range. The portion of the entire gamut of particles of the mixture being investigated and consisting only of this range is a particulate system as considered by the apparatus, and this meaning is also intended to be included by definition in the claims.

From the above, it will be seen that the expression "particulate system" means any range or ranges of particles between limits or without limits, and the nature of the apparatus defined by any claim will clearly enable those skilled in the art to understand the scope of such meaning and its limitations.

As will be appreciated from the discussion there are three quantities involved in the determination: namely, the total mass of the particulate system, that portion of the total larger than the dividing size, and that portion of the total smaller than the dividing size. If any two of these are known, the other may be found by simple addition or subtraction, if need be, and the dividing size may be chosen automatically or manually which divides the system into two portions having the desired relationship to each other or to the total system. The several embodiments contemplate apparatus based upon the comparison of the two portions of the system and the establishment of the desired relationship between them, and upon the comparison of the portion of the system having particle sizes larger than the dividing size with a predetermined fraction of the whole. Apparatus based upon the comparison of the portion of the system smaller than the dividing size with a predetermined fraction of the whole is not treated herein, but it will be apparent to those skilled in the art how to construct such apparatus using the principles and circuits set forth herein.

The total mass may be found either by the Coulter method or by non-Coulter methods, among which may be listed measurement of gross conductivity, or of physical displacement of suspending fluid or weight of total particulate matter in the system before performing a precision dilution. The combinations which may be formed are many and the embodiments described are only a few of the more simple, practical, and applicable to commercial applications; for a person skilled in the art to construct one of the combinations not specifically described would be a trivial rearrangement of the circuit functions of the invention, and would not constitute a departure from the scope thereof as defined in the appended claims.

We claim:

1. Apparatus for ascertaining that particle size, within a particulate system, above and below which size predetermined fractions of the total mass of the system are respectively included, said particle size being the dividing size between fractions, which comprises:
   A. means having at least a range limit for deriving a first electrical effect proportional to the mass of particulate material of a first fraction, said first fraction having said dividing size as one of its range limits;
   B. means for deriving a second electrical effect proportional to the mass of particulate material of a portion of said total mass, said portion including at least all of a second fraction and at most, both said fractions;
   C. means for comparing said effects; and
   D. at least one of said deriving means including:
      i. means for moving at least a representative sample of said particulate system suspended in a fluid medium relative to sensing means responsive to movement of individual particles by producing electrical changes in said sensing means proportional, respectively, to the sizes of said particles; and
      ii. means producing electrical pulses proportional to said respective changes.

2. Structure as claimed in claim 1 in which said range limit is adjustable and said comparing means comprise means for adjusting said range limit to establish a desired relationship between said first fraction and said portion and including means indicative of said adjustable range limit of the first fraction and adapted to be calibrated in terms of particle size.

3. Structure as claimed in claim 2 in which both of said deriving means comprise the structure of said one deriving means.

4. Structure as claimed in claim 2 in which said portion comprises only the second fraction.

5. Structure as claimed in claim 4 in which both fractions are equal.

6. Structure as claimed in claim 2 in which said portion comprises the total mass of said particulate system.

7. Structure as claimed in claim 6 in which said second deriving means comprise a gross particle measuring apparatus providing an electrical signal proportional to total particulate mass and said signal being said second electrical effect.

8. Structure as claimed in claim 6 in which said first fraction comprises total particulate mass of particles larger than said dividing size.

9. Structure as claimed in claim 6 in which said first fraction comprises total particulate mass of particles smaller than said dividing size.

10. Structure as claimed in claim 2 in which said first deriving means comprise a Coulter-type particle measuring apparatus; said adjustable range limiting means including an adjustable threshold circuit arranged to be changed to adjust the range limit which defines said dividing size.

11. Structure as claimed in claim 2 in which said indicative means comprise a manually operable device 12. Structure as claimed in claim 11 in which said indicative means comprise an electrically operated readout having an output proportional to first fraction and said portion, respectively.

13 Structure as claimed in claim 11 in which said indicative means comprise electrical balancing means.

14. Structure as claimed in claim 2 in which said means for adjusting said adjustable range limit is an electrically operated threshold circuit and said indicative means is electrically operated.

15. Structure as claimed in claim 14 in which said indicative means comprise a voltmeter.

16. Structure as claimed in claim 2 in which said sensing means comprise at least two graduate sensitivity sensing zones of the Coulter type which establish a corresponding number of contiguous ranges of particle size, and means are provided for combining the outputs of these ranges to form said first fraction and said portion and for ascertaining the range in which the dividing size lies.

17. Structure as claimed in claim 2 in which said effects are digital.

18. Apparatus for ascertaining that particle size of a particulate system above and below which size predetermined fractions of the total mass of the system are respectively included, said particle size being the dividing size between fractions, which comprises:
   A. signal producing means of the Coulter type including:
      i. means for moving a representative sample of a particulate system suspended in a fluid medium relative to a sensing device responsive to movement of individual particles by producing electrical changes in said sensing means proportional to the respective sizes of particles; and
      ii. means for producing electrical pulses as a result of such changes, and the respective electrical pulses being proportional in amplitude to the size of the respective particles producing the changes;
   B. means for generating first representative electrical quantities respectively proportional to amplitudes of said electrical pulses;
   C. means for separating said representative electrical quantities into two categories on the basis of the size of the particles respectively producing the same, the first category comprising all quantities greater than a measuring level, and the second category comprising all quantities less than said measuring level, said measuring level being calibrated to be proportional to particle size;
   D. means for producing at least one signal representing the relationship between categories accumulated; and
   E. means for adjusting the measuring level to produce a desired relationship between categories such that said at least one signal is indicative of said relationship and identifies said dividing size.

19. Apparatus as claimed in claim 18 in which said penultimate means comprise a plurality of accumulating devices producing visible phenomena indicating response and thereby enabling adjustment of the last-mentioned means.

20. Apparatus as claimed in claim 18 in which said penultimate means comprise a plurality of accumulating devices, having outputs connected to an electrical comparison device including a readout enabling adjustment of said last-mentioned means.

21. Apparatus as claimed in claim 18 in which the means for adjusting the measuring level is manually controlled and means are provided for weighting the quantities such that any desired relationship will result in a null comparison to be used while adjusting the measuring level.

22. Apparatus as claimed in claim 21 in which the weighting means are included with said comparing means.

23. Apparatus as claimed in claim 21 in which the weighting means are other than in said comparing means.

24. Apparatus as claimed in claim 18 in which the means for adjusting the measuring level comprise an integrating amplifier supplying a feedback to said separating means, means for comparing said separated quantities, said integrating amplifier being connected to said comparing means to receive the output thereof.

25. Apparatus as claimed in claim 24 in which means are provided for weighting the quantities such that any desired relationship will provide an equilibrium condition in said integrating amplifier with a resulting condition of measuring level.

26. Apparatus as claimed in claim 24 in which readout means are provided for measuring the feedback output of said integrating amplifier as a quantity proportional to measuring level.

27. Apparatus as claimed in claim 18 in which said quantities are equal whereby the relationship between quantities is one to one and the measuring level represents mass median.

28. Apparatus as claimed in claim 18 in which the separating means comprise a variable threshold circuit and the measuring level comprises the threshold level of said circuit.

29. Apparatus as claimed in claim 28 in which said apparatus has two channels connected to transmit said categories of pulses respectively to said generating means; said first category comprising all pulses which exceed the threshold and said second category comprising all pulses which do not exceed said threshold.

30. Apparatus as claimed in claim 18 in which said categories of pulses are applied to said comparing means with opposite polarities and said comparing means combines said pulses algebraically.

31. Apparatus as claimed in claim 30 in which said comparing means includes an integrating amplifier and the means for adjusting the measuring level comprise a feedback circuit from said integrating amplifier to said separating means.

32. Apparatus as claimed in claim 31 in which readout means are provided to measure the output of said integrating amplifier to said feedback circuit, said output being proportional to measuring level.

33. Apparatus as claimed in claim 18 in which said separating means include a variable threshold device, precision pulse shaping means and switch control means, and in which said generating means comprise a pair of switches for providing electric current outputs, the said measuring level being the threshold of said threshold device; said pulse shaping means receiving all electrical pulses and converting same into equal duration pulses of amplitudes equal respectively to the original pulses; the threshold device being connected to said switch control means and operating to direct said equal duration pulses to one or the other of said switches depending upon whether its amplitude exceeds said threshold; the pulses passing through each switch forming the first and second electrical quantities, respectively.

34. Apparatus as claimed in claim 33 in which means are provided to invert the phase of one of said quantities in which said comparing means include a summation network for adding the quantities algebraically.

35. Apparatus as claimed in claim 33 in which said pulse shaping means include a pulse stretcher and means for excising only a portion of each stretched pulse to provide said equal duration pulses.

36. Apparatus as claimed in claim 18 in which said separating means include a variable threshold device, precision pulse shaping means and switch control means; and in which said generating and accumulating means comprise a pair of switches for providing electric current outputs; the said measuring level being the threshold of said threshold device; said pulse shaping means receiving all electrical pulses and converting same into equal duration pulse signals proportional respectively to the amplitudes of the original pulse signals; the threshold device being connected to said switch control means and operating to direct said equal duration pulse signals to one or the other of said switches depending upon whether its amplitude exceeds said threshold; the pulse signals passing through each switch forming the first and second electrical quantities, respectively.

37. Apparatus as claimed in claim 36 in which means are provided to invert the phase of one of said quantities and in which said comparing means include a summation network for adding said first and second electrical quantities algebraically.

38. Apparatus as claimed in claim 36 in which said pulse shaping means comprises a diode-capacitor pump circuit.

39. Apparatus as claimed in claim 18 in which there are a plurality of signal producing means, a plurality of range circuits, each connected to one said signal producing means and having individual separating means generating and accumulating means, and comparing means; the summation means being common to all ranges and including all comparing means; said adjusting means comprising an integrating amplifier connected with the summation means, said apparatus including programming means for connecting said integrating amplifier with the separating means one after another, if needed, and acting to vary said measuring level of the separating means with which it is connected while at the same time separating all pulses in all ranges of greater and lesser amplitude than said level into said two quantities for comparison; the connection between integrating amplifier and a different separating means continuing to occur until a state of equilibrium is reached; the output of said integrating amplifier being proportional to particle size.

40. Apparatus as claimed in claim 18 in which the means for adjusting the measuring level comprise an add-subtract register supplying a feedback to said separating means, said add-subtract register being connected to said comparing means to receive the output thereof.

41. Apparatus as claimed in claim 40 in which means are provided for weighting the quantities such that any desired relationship will provide an equilibrium condition in said add-subtract register with a resulting condition of measuring level.

42. Apparatus as claimed in claim 41 in which readout means are provided for measuring the feedback output of said add-subtract register as a quantity proportional to measuring level.

43. Apparatus as claimed in claim 18 in which the separating means comprise an analogue to digital converter and a digital comparator and the measuring level comprises a digitally coded number; the digital coded number representing each particle-produced pulse amplitude being applied to a first input of said comparator and the digitally coded measuring level being applied to the second input of said comparator.

44. Apparatus as claimed in claim 43 in which the digitally coded numbers are binary coded.

45. Apparatus as claimed in claim 18 in which the separating means comprise an analogue to digital converter and a digital comparator; the measuring level comprises a digitally coded number, and the means for accumulating and comparing the first and second electrical quantities respectively proportional to cumulative particle mass comprises an add-subtract digital register.

46. Apparatus as claimed in claim 45 in which said apparatus includes means for transmitting said categories to said add-subtract register in such a manner that digitally coded pulse amplitudes of the first category are added to and those of the second category are subtracted from the number stored in said register; said first category comprising all digitally coded pulse amplitudes which exceed the measuring level and said second category comprising all digitally coded pulse amplitudes which do not exceed said measuring level.

47. Apparatus for ascertaining that particle size of particulate system above and below which size predetermined fractions of the total mass of the system are respectively included, said particle size being the dividing size between fractions, which comprises:

A. signal producing means of the Coulter type including:
  i. means for moving a representative sample of a particulate system suspended in a fluid medium relative to a sensing device responsive to movement of individual particles by producing electrical changes in said sensing means proportional to the respective sizes of particles; and
  ii. means for producing electrical pulses as a result of such changes, and the respective electrical pulses being proportional in amplitude to the size of the respective particles producing the changes;

B. means for generating first representative electrical quantities respectively proportional to amplitudes of said electrical pulses;

C. means for separating said representative electrical quantities into two categories on the basis of the size of the particles respectively producing the same, the first category comprising all quantities greater than a measuring level, and the second category comprising all quantities less than said measuring level; said measuring level being calibrated to be proportional to particle size;

D. means for accumulating the separated representative electrical quantities of one category into a first accumulated electrical quantity proportional to cumulative particle mass;

E. means for measuring the total mass of the system to obtain a second representative electrical quantity proportional to a predetermined fraction of said total mass;

F. means for comparing said first accumulated electrical quantity and said second representative quantity one with the other; and G. means for adjusting the measuring level to produce a desired relationship between quantities, the resulting measuring level thereby comprising the dividing size of particle representing the relationship between the fraction of total mass represented by said one category of particles and the said predetermined fraction of mass represented by the second quantity.

48. Apparatus as claimed in claim 47 in which the means for measuring said second electrical quantity includes weighting means whereby said comparing means operates upon weighted electrical quantities.

49. Apparatus as claimed in claim 47 in which the means for adjusting the measuring level comprises an integrating amplifier supplying a feedback to said separating means, said integrating amplifier being connected to said comparing means to receive the output thereof.

50. Apparatus as claimed in claim 49 in which means are provided for weighting the quantities such that any desired relationship will provide an equilibrium condition in said integrating amplifier with a resulting condition of measuring level.

51. Apparatus as claimed in claim 47 in which said quantities are equal whereby the relationship between quantities is one to one and the measuring level represents the mass median.

52. Apparatus as claimed in claim 47 in which the means for measuring the entire mass of the system comprise Coulter apparatus.

53. The method of ascertaining the dividing particle size for any desired percentile mass of a particulate system which includes passing a sample of said system through a Coulter apparatus to obtain a string of electric pulses of amplitudes respectively proportional to said particles; choosing a preliminary particle size of the system and dividing the pulses into two categories whose amplitudes are respectively above and below said preliminary particle size; continuously accumulating the respective categories and converting same into electrical quantities and comparing continuously the accumulated quantities one with the other; changing the particle size up or down until the compared quantities have a particular relationship representing the desired mass percentile; the particle size resulting in such condition comprising the dividing particle size for such sample.

54. The method of ascertaining the dividing particle size for any desired mass percentile of a particulate system which includes passing a sample of said system through a Coulter apparatus to obtain a string of electric pulses of amplitudes respectively proportional to said particles; subjecting said system to a signal related to the mass of the entire particulate system; attenuating the last signal and converting same into a first electrical quantity proportional to the desired mass percentile; choosing a preliminary particle size of the system and dividing the electric pulses into two categories whose amplitudes are respectively above and below said preliminary particle size; continuously accumulating one category and converting the same into a second electrical quantity and continuously comparing the quantities one with the other; changing the preliminary particle size up or down until the compared quantities have a particular relationship representing the desired mass percentile; the particle size resulting in such condition comprising the dividing particle size for such sample.

PO-1050
(5/69)

UNITED STATES PATENT OFFICE
CERTIFICATE OF CORRECTION

Patent No. ___3,557,352___   Dated __January 19, 1971__

Inventor(s) __WALLACE H. COULTER et al__

It is certified that error appears in the above-identified patent and that said Letters Patent are hereby corrected as shown below:

Column 2, line 2, after "give" insert --the--. Column 4, line 28, change "simplification" to --simplifications--. Column 9, line 4, change "8" to --58--; line 44, correct the formula to read: $\int i_1 dt - \int i_2 dt = \int (i_1 - i_2) dt$ . Column 11, line 42, char "see" to --seen--. Column 12, line 13, change "s" to --is--. Column 14, line 42, change "time" to --times--; line 66, delet the exclamation mark (!). Column 16, line 46, change "represe to --represents--. Column 17, line 10, after "resistors" inse a --(--; line 11, after "generators" insert a --)--. Column line. 2, change "anyone" to --any one--; line 50, delete "and' (first occurrence); line 59, change lower case"b" to upper c --B--; line 68, delete "CIRCUIT 0*0-B" and insert --circuit 283 Column 20, line 75, after "respectively" change the comma to a period. Column 21, line 6, change "Nand" to --N and--; line change the semicolon to a period and insert --If--;

line 35, change "digit" to --digital--. Column 27, line 69, a "device" insert a period. Column 28, line 8, change "graduate to --graduated--. Column 32, line 26, after "signal" insert --producing device operating by a gross method to obtain a signal--.

Signed and sealed this 3rd day of August 1971.

(SEAL)
Attest:

EDWARD M. FLETCHER, JR.        WILLIAM E. SCHUYLER, JR.
Attesting Officer              Commissioner of Patents

UNITED STATES PATENT OFFICE
CERTIFICATE OF CORRECTION

Patent No. 3,557,352   Dated January 19, 1971

Inventor(s)  Walter R. Hogg et al.

It is certified that error appears in the above-identified patent and that said Letters Patent are hereby corrected as shown below:

Column 21, line 17, before the period insert -- , it provides a multiplication factor --; lines 18 and 19, cancel ", it provides a multiplication factor".

Signed and sealed this 14th day of March 1972.

(SEAL)
Attest:

EDWARD M. FLETCHER, JR.
Attesting Officer

ROBERT GOTTSCHALK
Commissioner of Patents